(12) United States Patent
Sakurai et al.

(10) Patent No.: US 9,296,471 B2
(45) Date of Patent: Mar. 29, 2016

(54) SWING WING TIP SYSTEM, ASSEMBLY AND METHOD WITH DUAL LOAD PATH STRUCTURE

(71) Applicant: The Boeing Company, Chicago, IL (US)

(72) Inventors: Seiya Sakurai, Seattle, WA (US); Ryan W. Kosko, Everett, WA (US); Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 14/047,012

(22) Filed: Oct. 6, 2013

(65) Prior Publication Data

US 2015/0097087 A1     Apr. 9, 2015

(51) Int. Cl.
| | |
|---|---|
| *B64C 9/00* | (2006.01) |
| *B64C 3/40* | (2006.01) |
| *B64C 3/56* | (2006.01) |
| *B64C 5/14* | (2006.01) |
| *B64C 23/06* | (2006.01) |

(52) U.S. Cl.
CPC ... *B64C 9/00* (2013.01); *B64C 3/40* (2013.01); *B64C 3/56* (2013.01); *B64C 5/14* (2013.01); *B64C 23/065* (2013.01)

(58) Field of Classification Search
None
See application file for complete search history.

(56) References Cited

U.S. PATENT DOCUMENTS

| | | | | |
|---|---|---|---|---|
| 2,166,564 | A * | 7/1939 | Pavlecka et al. | 244/49 |
| 2,422,056 | A * | 6/1947 | Vogt | 244/129.1 |
| 2,683,574 | A * | 7/1954 | Peterson | 244/46 |
| 2,961,196 | A * | 11/1960 | Atkinson | 244/46 |
| 3,064,928 | A * | 11/1962 | Toll | 244/46 |
| 3,292,881 | A * | 12/1966 | Ricard | 244/46 |
| 3,556,439 | A * | 1/1971 | Autry et al. | 244/210 |
| 3,559,924 | A * | 2/1971 | Jochner | 244/46 |
| 3,572,617 | A * | 3/1971 | Ricard | 244/46 |
| 3,645,477 | A * | 2/1972 | Kratschmar et al. | 244/46 |
| 3,662,974 | A * | 5/1972 | Peterson | 244/46 |

(Continued)

FOREIGN PATENT DOCUMENTS

| | | | | |
|---|---|---|---|---|
| DE | 2103663 | * | 8/1972 | B64C 3/40 |
| DE | 2103663 A1 | | 8/1972 | |
| EP | 0988225 B1 | | 10/2006 | |

OTHER PUBLICATIONS

Young et al., "Aircraft Excrescence Drag," North Atlantic Treaty Organization Advisory Group for Aerospace Research and Development AGARD-AG-264, Jul. 1981, 172 pages.

(Continued)

*Primary Examiner* — Medhat Badawi

(57) ABSTRACT

A swing wing tip system for an air vehicle is provided. The swing wing tip system has a swing wing tip assembly with an unfixed wing tip portion movably connected to a fixed wing portion of a wing. The swing wing tip assembly has a dual load path structure configured to transfer load from the unfixed wing tip portion to the fixed wing portion. The dual load path structure has dual wing skin plates and a rotation joint coupled between the dual wing skin plates and configured to rotationally couple the unfixed wing tip portion to the fixed wing portion. The rotation joint has a dual rotation pin element having a center rotation axis and dual rotation elements configured to rotate about the center rotation axis. The swing wing tip system has an actuator assembly coupled to the rotation joint and a controller system coupled to the actuator assembly.

21 Claims, 21 Drawing Sheets

(56) References Cited

U.S. PATENT DOCUMENTS

| | | | |
|---|---|---|---|
| 3,680,816 A * | 8/1972 | Mello | 244/46 |
| 3,737,121 A * | 6/1973 | Jones | 244/13 |
| 4,824,053 A * | 4/1989 | Sarh | 244/218 |
| 4,998,689 A * | 3/1991 | Woodcock | 244/46 |
| 5,201,479 A * | 4/1993 | Renzelmann | 244/49 |
| 5,350,135 A * | 9/1994 | Renzelmann et al. | 244/49 |
| 5,379,969 A * | 1/1995 | Marx et al. | 244/49 |
| 5,381,986 A * | 1/1995 | Smith et al. | 244/49 |
| 5,427,329 A * | 6/1995 | Renzelmann et al. | 244/49 |
| 5,452,643 A * | 9/1995 | Smith et al. | 91/382 |
| 5,558,299 A * | 9/1996 | Veile | 244/49 |
| 5,988,563 A * | 11/1999 | Allen | 244/49 |
| 6,076,766 A * | 6/2000 | Gruensfelder | 244/49 |
| 6,089,502 A | 7/2000 | Herrick et al. | |
| 6,260,799 B1 * | 7/2001 | Russ | 244/49 |
| 6,834,835 B1 * | 12/2004 | Knowles et al. | 244/198 |
| 7,051,974 B2 * | 5/2006 | Stuhr | 244/46 |
| 7,275,722 B2 | 10/2007 | Irving et al. | |
| 7,445,180 B2 * | 11/2008 | Plude et al. | 244/118.1 |
| 7,637,454 B2 * | 12/2009 | Pitt | 244/48 |
| 7,744,038 B2 | 6/2010 | Sankrithi et al. | |
| 8,089,034 B2 * | 1/2012 | Hammerquist | 244/3.28 |
| 8,342,447 B2 * | 1/2013 | Etling | 244/90 R |
| 2004/0061029 A1 * | 4/2004 | McCarthy | 244/199 |
| 2005/0133672 A1 * | 6/2005 | Irving et al. | 244/201 |
| 2005/0230531 A1 * | 10/2005 | Horinouchi | 244/47 |
| 2005/0276657 A1 * | 12/2005 | Yumikino | 403/92 |
| 2010/0079729 A1 * | 4/2010 | Scanlon | 353/13 |
| 2010/0084516 A1 * | 4/2010 | Eberhardt | 244/218 |
| 2011/0001016 A1 * | 1/2011 | Skillen et al. | 244/218 |
| 2011/0031351 A1 * | 2/2011 | Wildman | 244/131 |
| 2011/0042525 A1 * | 2/2011 | Parker | 244/213 |
| 2011/0226904 A1 * | 9/2011 | Flemming | 244/134 F |
| 2012/0032023 A1 * | 2/2012 | Bousfield et al. | 244/49 |
| 2012/0299428 A1 * | 11/2012 | Doyle et al. | 310/154.43 |
| 2013/0099060 A1 * | 4/2013 | Dees et al. | 244/199.4 |
| 2014/0145039 A1 * | 5/2014 | Beyer et al. | 244/215 |
| 2014/0312175 A1 * | 10/2014 | Sakurai et al. | 244/214 |
| 2014/0357179 A1 * | 12/2014 | Londiche et al. | 454/322 |
| 2014/0361539 A1 * | 12/2014 | Carter | 290/44 |

OTHER PUBLICATIONS

Fox, "Fold Wing Tip Having Stub Spar," U.S. Appl. No. 13/251,216, filed Oct. 1, 2011, 16 pages.

Kordel et al., "Latching Apparatus and Methods," U.S. Appl. No. 13/493,688, filed Jun. 11, 2012, 38 pages.

"Swing Tip Assembly Rotation Joint", U.S. Appl. No. 13/530,089, filed Jun. 21, 2013, 51 pages.

Good et al., "Wing Hinge Assembly Including Hinged Torque Boxes", U.S. Appl. No. 13/664,371, filed Oct. 30, 2012, 20 pages.

Dong, "Adaptive Wing for an Aircraft," U.S. Appl. No. 13/871,296, filed Apr. 26, 2013, 27 pages.

Santini et al., "Horizontal Folding Wingtip", U.S. Appl. No. 13/964,072, filed Aug. 10, 2013, 63 pages.

"Folding wing," Wikipedia Foundation, Inc., last modified Sep. 13, 2013, 5 pages, accessed Oct. 18, 2013, <http://en.wikipedia.org/wiki/Folding_wing>.

Extended European Search Report mailed Feb. 24, 2015, for counterpart EP application EP14187323.2-1754, Applicant the Boeing Company, 8 pages.

* cited by examiner

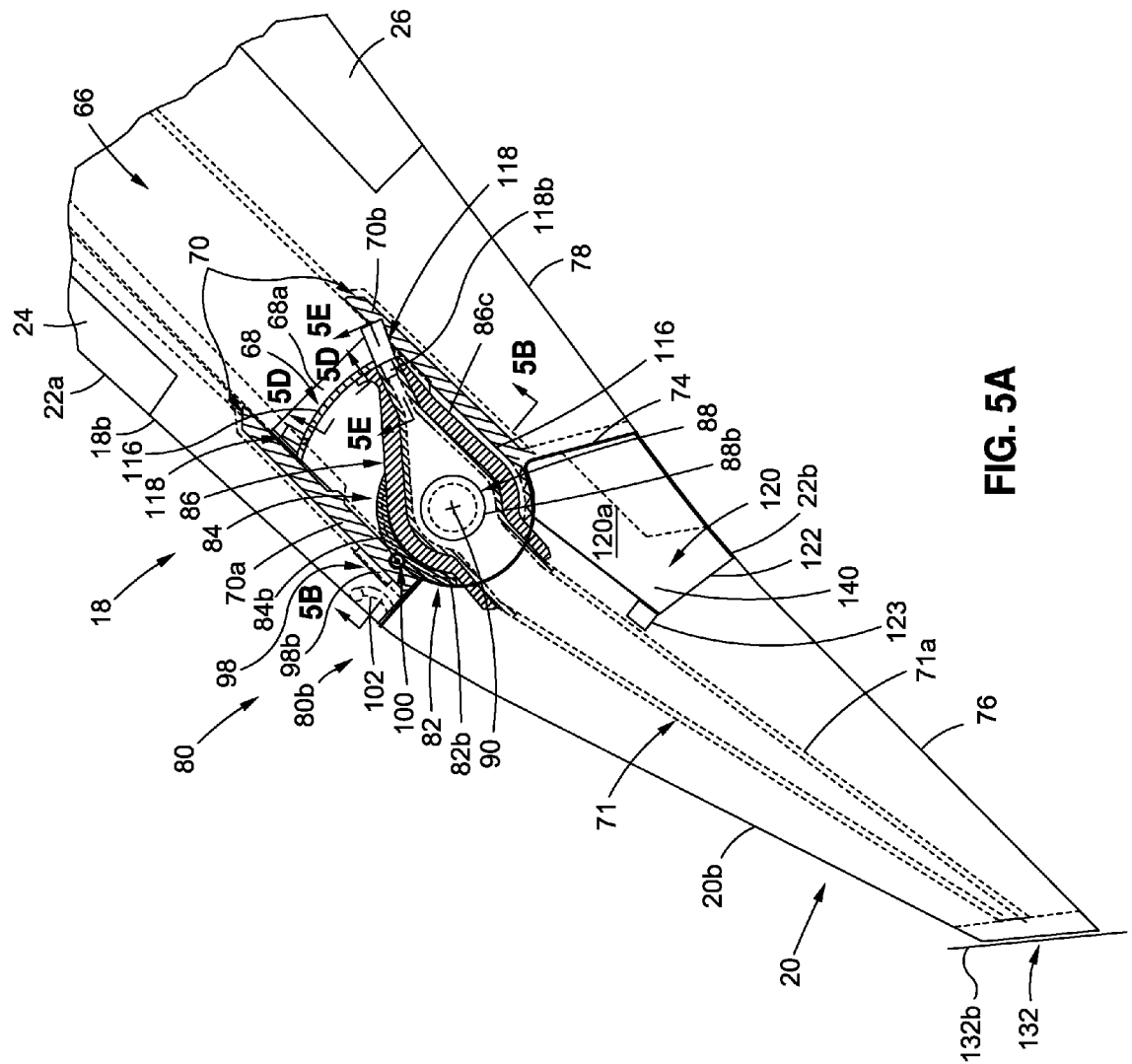

SWING WING TIP SYSTEM, ASSEMBLY AND METHOD WITH DUAL LOAD PATH STRUCTURE

CROSS REFERENCE TO RELATED APPLICATIONS

This nonprovisional patent application is related to U.S. nonprovisional patent application Ser. No. 13/530,089, titled "SWING TIP ASSEMBLY ROTATION JOINT", filed on Jun. 21, 2012, and this nonprovisional patent application is also related to U.S. nonprovisional patent application Ser. No. 13/964,072, titled "HORIZONTAL FOLDING WINGTIP", filed on Aug. 10, 2013. The contents of both of these filed U.S. nonprovisional patent applications are hereby incorporated by reference in their entireties.

BACKGROUND

1) Field of the Disclosure

The disclosure relates generally to wing systems, assemblies, and methods for air vehicles, and more particularly, to wing tip systems, assemblies, and methods having dual load path structures for air vehicles, such as aircraft.

2) Description of Related Art

Designing an aircraft having a configuration to improve fuel efficiency is an important consideration as fuel costs increase. Increasing or lengthening the wingspan of an aircraft may be used to increase performance of the aircraft, such as lift-to-drag efficiency performance, which may, in turn, improve fuel efficiency. Thus, aircraft with longer wingspans may be more performance efficient than aircraft with shorter wingspans.

However, increasing or lengthening the wingspan of an aircraft to increase aircraft performance may limit or prevent the aircraft's use at airports having size restrictions with respect to airport gates, taxiways, runways, or other infrastructure. Airports with airport gates, taxiways, runways, and other infrastructure constructed for one generation of aircraft may be too small to accommodate later generations of aircraft having increased wingspans. For example, such airports may be limited to aircraft with a wingspan length of 213 feet or smaller, i.e., tip-to-tip wingspan, at the airport gates or on the airport taxiways and runways or other infrastructure. The airport gates, taxiways, runways and other infrastructure of airports having such size restrictions would have to be modified to allow aircraft with an increased wingspan to travel and operate at the airport gates or on the airport taxiways and runways. However, modifying or reconfiguring such airport infrastructure, including gates, taxiways, and runways, may be an expensive and time consuming undertaking.

In addition to improved fuel efficiency as a design consideration for aircraft, providing fail-safe load paths for primary load carrying members, such as wings, of an aircraft may also be an important design consideration. As used herein, "fail-safe" means a structure, system, assembly, and/or method having a redundant feature, for example, a redundant load path, which in the event of a failure in one load path to carry the load, a second load path is configured to carry the load. Known wing structures for aircraft exist having wing tip systems that fold to shorten the wingspan and unfold to lengthen the wingspan. However, such known wing structures may only have a single load path.

Thus, it is desirable to provide an aircraft having wing structures with fail-safe load paths, such as dual load paths, while also having wing structures with folding wing tips to reduce and expand the wingspan of the aircraft in order to be able to operate at an airport having size restrictions with respect to aircraft wingspan.

Accordingly, there is a need in the art for an improved wing tip system, assembly, and method that provide advantages over known wing tip systems, assemblies, and methods.

SUMMARY

This need for an improved wing tip system, assembly, and method is satisfied. As discussed in the below detailed description, embodiments of the improved wing tip system, assembly, and method may provide significant advantages over known wing tip systems, assemblies, and methods.

In one embodiment of the disclosure, there is provided a swing wing tip system for an air vehicle. The swing wing tip system comprises a swing wing tip assembly. The swing wing tip assembly comprises an unfixed wing tip portion movably connected to a fixed wing portion of a wing of an air vehicle.

The swing wing tip assembly further comprises a dual load path structure configured to transfer load from the unfixed wing tip portion to the fixed wing portion. The dual load path structure comprises dual wing skin plates and a rotation joint coupled between the dual wing skin plates and configured to rotationally couple the unfixed wing tip portion to the fixed wing portion. The rotation joint comprises a dual rotation pin element have a center rotation axis and dual rotation elements configured to rotate about the center rotation axis.

The swing wing tip system further comprises an actuator assembly operatively coupled to the rotation joint to actuate the rotation joint, enabling rotation of the unfixed wing tip portion with respect to the fixed wing portion about the center rotation axis at a selected operation condition. The swing wing tip system further comprises a controller system operatively coupled to the actuator assembly to control actuation of the rotation joint and rotation of the unfixed wing tip portion.

In another embodiment of the disclosure, there is provided an aircraft having fail-safe load paths for one or more wings. The aircraft comprises at least one fuselage and at least one wing having a swing wing tip assembly. The swing wing tip assembly comprises an unfixed wing tip portion movably connected to a fixed wing portion of the one or more wings.

The swing wing tip assembly further comprises a dual load path structure providing fail-safe load paths for the one or more wings and configured to transfer load from the unfixed wing tip portion to the fixed wing portion. The dual load path structure comprises dual wing skin plates comprising an upper wing skin and a lower wing skin. Each wing skin has a plate portion attached to the wing skin.

The dual load path structure further comprises a rotation joint coupled between the dual wing skin plates and configured to rotationally couple the unfixed wing tip portion to the fixed wing portion. The rotation joint comprises a dual rotation pin element having a center rotation axis and dual rotation elements configured to rotate about the center rotation axis. The dual load path structure further comprises dual channel segments coupled between the dual wing skin plates.

The one or more wings further comprises an actuator assembly operatively coupled to the rotation joint to actuate the rotation joint, enabling rotation of the unfixed wing tip portion with respect to the fixed wing portion about the center rotation axis at a selected operation condition. The one or more wings further comprises a controller system operatively coupled to the actuator assembly to control actuation of the rotation joint and rotation of the unfixed wing tip portion. The one or more wings further comprises a navigation element positioned near a hinge line between the fixed wing portion and the unfixed wing tip portion and operable to be exposed and activated in response to rotation of the unfixed wing tip portion.

In another embodiment of the disclosure, there is provided a method for providing fail-safe load paths for a wing of an air vehicle. The method comprises the step of operatively coupling a swing wing tip assembly to a wing of an air vehicle. The swing wing tip assembly comprises an unfixed wing tip portion movably connected to a fixed wing portion of the wing, and a dual load path structure. The dual load path structure comprises dual wing skin plates and a rotation joint coupled between the dual wing skin plates. The rotation joint comprises a dual rotation pin element having a center rotation axis and dual rotation elements configured to rotate about the center rotation axis.

The method further comprises the step of operatively coupling an actuator assembly to the rotation joint. The method further comprises the step of operatively coupling a controller system to the actuator assembly to control the actuator assembly to actuate the rotation joint. The method further comprises the step of transferring load from the unfixed wing tip portion to the fixed wing portion via the dual load path structure to provide fail-safe load paths for the wing.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings, which are provided to facilitate understanding of the disclosure without limiting the breadth, scope, scale, or applicability of the disclosure, and which illustrate preferred and exemplary embodiments, but which are not necessarily drawn to scale, wherein:

FIG. 5A is an illustration of a cutaway top plan view of a wing in an unfolded flight position having another embodiment of a swing wing tip system and a swing wing tip assembly according to the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
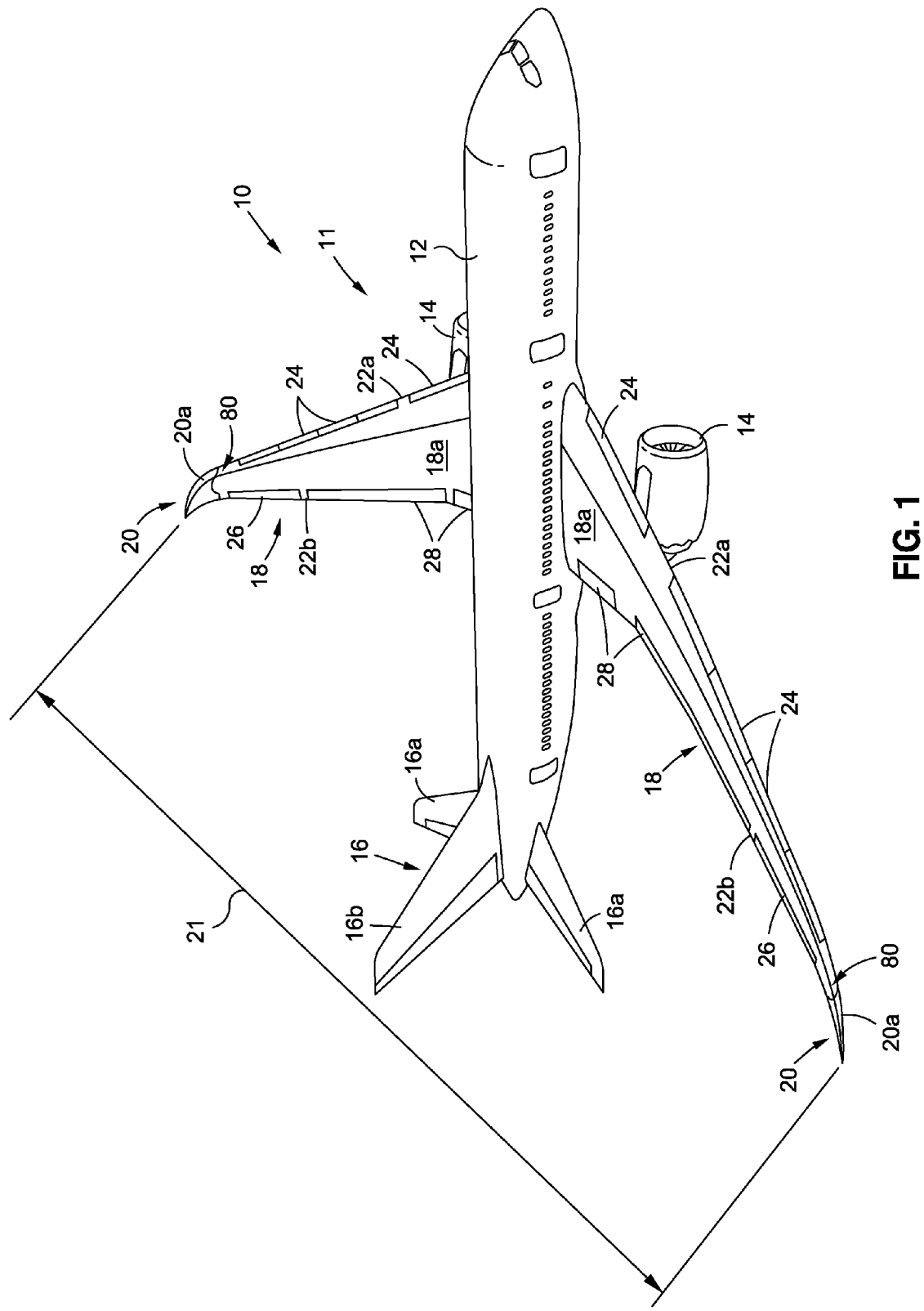
FIG. 1 is an illustration of a perspective view of an air vehicle incorporating an exemplary embodiment of a swing wing tip system of the disclosure.

Now referring to the Figures, FIG. 1 is an illustration of a perspective view of an air vehicle 10 incorporating an exemplary embodiment of a swing wing tip system 80 of the disclosure. As shown in FIG. 1, the air vehicle 10, such as in the form of aircraft 11, comprises a fuselage 12, engines 14, a tail 16 with horizontal stabilizers 16a and a vertical stabilizer 16b, wings 18, such as in the form of swing wings 18a, and wing tips 20, such as in the form of swing wing tips 20a. As further shown in FIG. 1, the air vehicle 10 has a wingspan 21 spanning the distance between the wing tips 20. As further shown in FIG. 1, each wing 18, such as in the form of swing wing 18a, may comprise a leading edge 22a, a trailing edge 22b and control surfaces such as slats 24, ailerons 26, and flaps 28. The control surfaces may further comprise, for example but without limitation, an elevator, a spoiler, an elevon, or other control surface.

Although the air vehicle 10, such as aircraft 11, shown in FIG. 1 is generally representative of a commercial passenger aircraft having one or more wings 18 with one or more embodiments of the swing wing tip system 80, the teachings of the disclosed embodiments may be applied to other passenger aircraft, cargo aircraft, military aircraft, rotorcraft, and other types of aircraft or air vehicles having one or more wings.

Figure 2A:
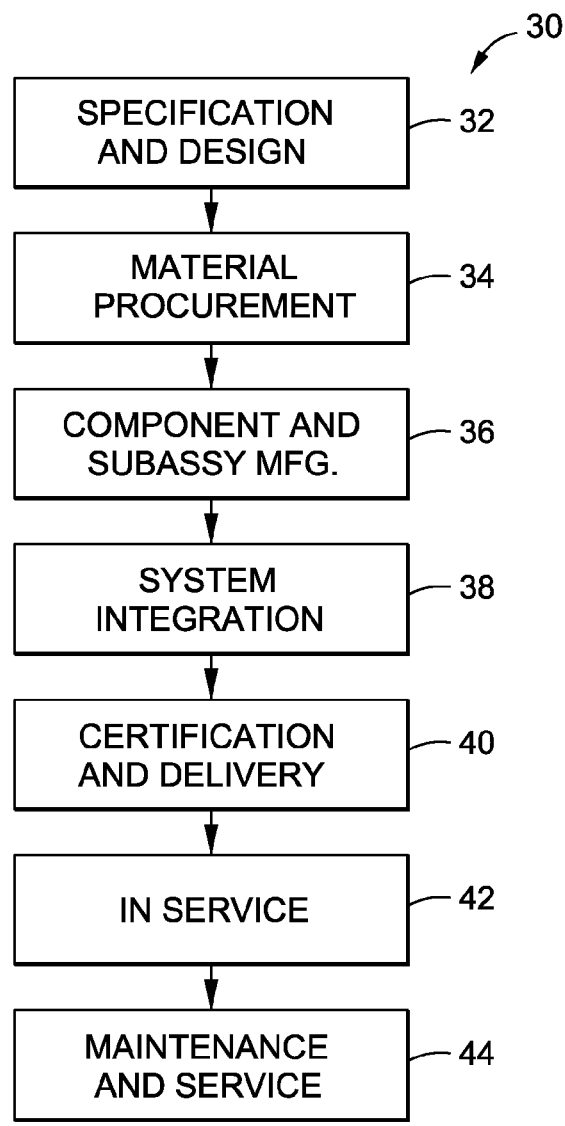
FIG. 2A is an illustration of a flow diagram of an exemplary aircraft manufacturing and service method.
Figure 2B:
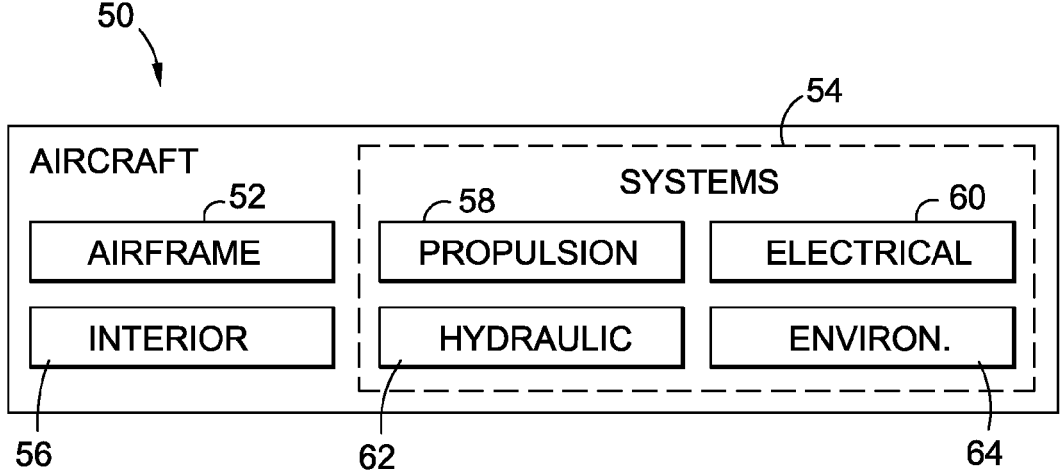
FIG. 2B is an illustration of an exemplary block diagram of an aircraft.

FIG. 2 is an illustration of a flow diagram of an exemplary aircraft manufacturing and service method 30. FIG. 3 is an illustration of an exemplary block diagram of an aircraft 50. Referring to FIGS. 2-3, embodiments of the disclosure may be described in the context of the aircraft manufacturing and service method 30 as shown in FIG. 2 and the aircraft 50 as shown in FIG. 3. During pre-production, exemplary aircraft manufacturing and service method 30 may include specification and design 32 of the aircraft 50 and material procurement 34. During manufacturing, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 (which may also include modification, reconfiguration, refurbishment, and other suitable services).

Each of the processes of the aircraft manufacturing and service method 30 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 50 produced by the exemplary aircraft manufacturing and service method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and systems embodied herein may be employed during any one or more of the stages of the aircraft manufacturing and service method 30. For example, components or subassemblies corresponding to component and subassembly manufacturing 36 may be fabricated or manufactured in a manner similar to components or subassemblies produced while the aircraft 50 is in service. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service, for example and without limitation, to maintenance and service 44.

Figure 3A:
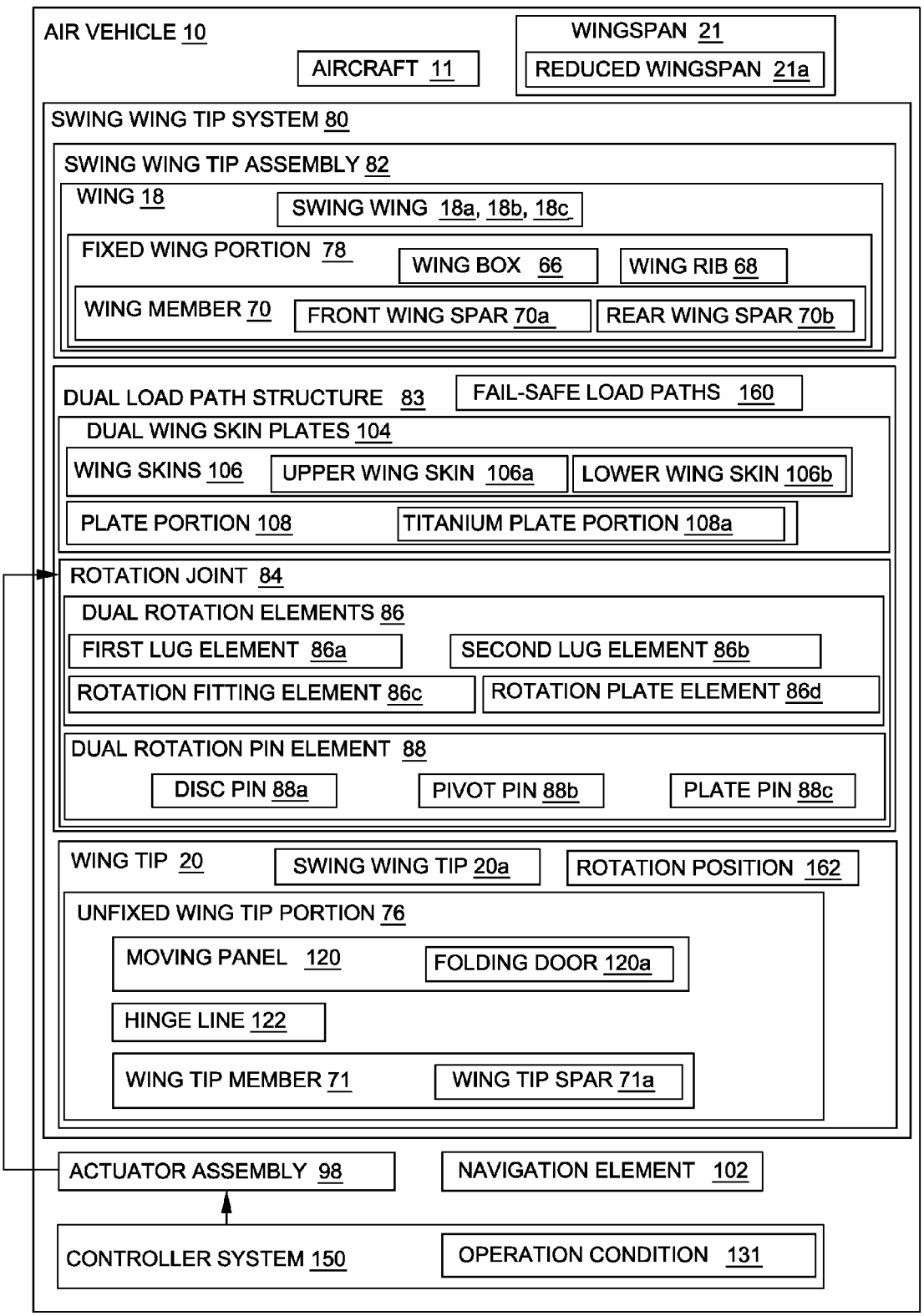
FIG. 3A is an exemplary block diagram of a swing wing tip system and a swing wing tip assembly according to one or more embodiments of the disclosure.

In one embodiment of the disclosure, there is provided a swing wing tip system 80 (see FIGS. 3A, 4A, 5A, 6A) for an air vehicle 10 (see FIGS. 1, 3A). The swing wing tip system 80 (see FIGS. 3A, 4A, 5A, 6A) comprises a swing wing tip assembly 82 (see FIGS. 3A, 4A, 5A, 6A). FIG. 3A is an exemplary block diagram of the swing wing tip system 80 and the swing wing tip assembly 82 according to one or more embodiments of the disclosure.

Figure 3B:
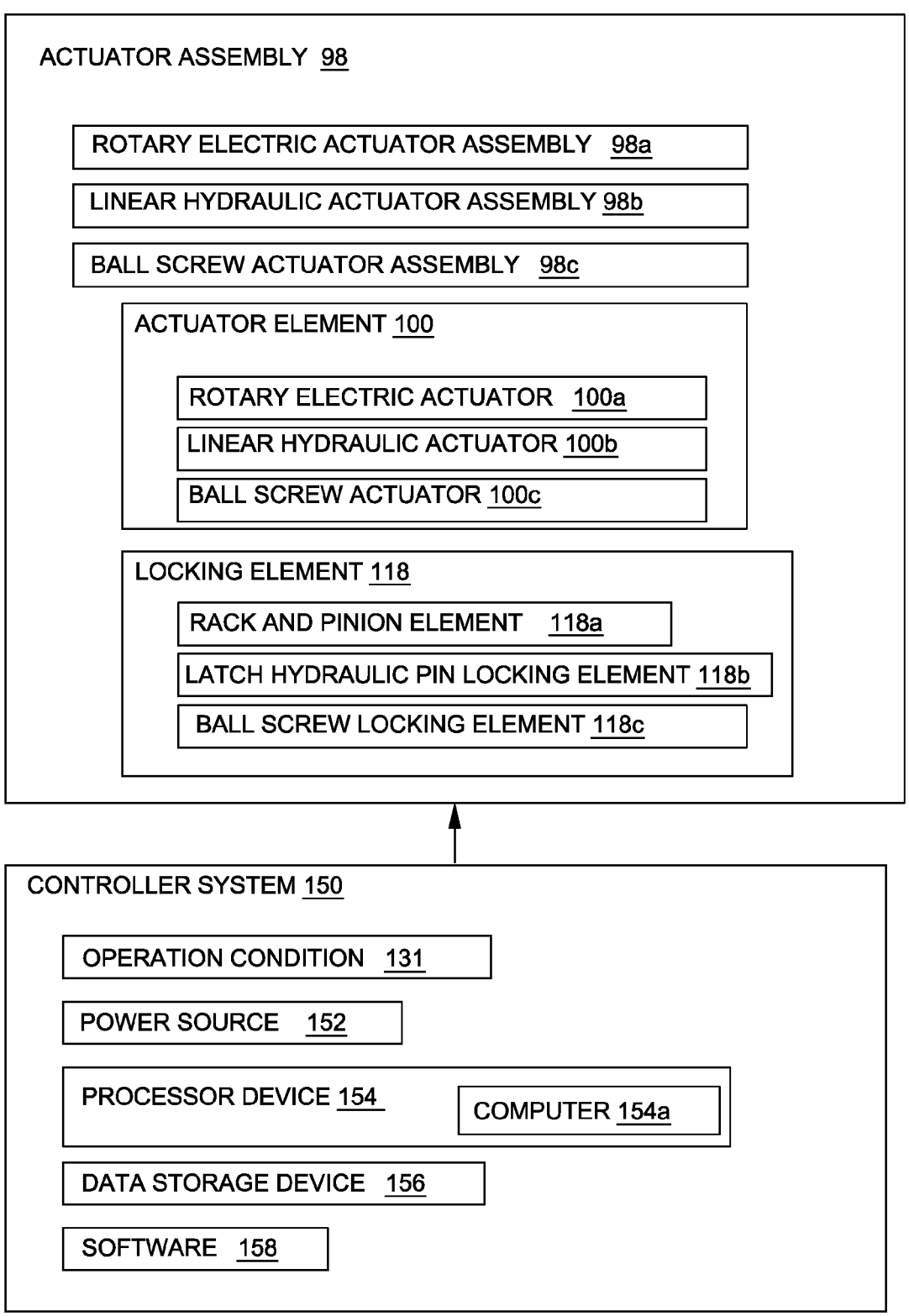
FIG. 3B is an exemplary block diagram of an actuator assembly and a controller system that may be used in one or more embodiments of a swing wing tip system according to the disclosure.

As shown in FIG. 3A, the swing wing tip system 80 comprises the swing wing tip assembly 82, an actuator assembly 98 and a controller system 150. FIG. 3B is an exemplary block diagram of the actuator assembly 98 and the controller system 150 that may be used in one or more embodiments of the swing wing tip system 80 according to the disclosure.

As further shown in FIG. 3A, the swing wing tip assembly 82 comprises a fixed wing portion 78, an unfixed wing tip portion 76, and a dual load path structure 83. The unfixed wing tip portion 76 (see FIGS. 3A, 4A, 5A, 6A) is preferably movably connected to the fixed wing portion 78 (see FIGS. 3A, 4A, 5A, 6A) of the wing 18 (see FIGS. 3A, 4A, 5A, 6A) of the air vehicle 10 (see FIGS. 1, 3A), such as aircraft 11 (see FIGS. 1, 3A).

The dual load path structure 83 (see FIGS. 3A, 4B, 5B, 6A) is preferably configured to transfer load from the unfixed wing tip portion 76 (see FIGS. 3A, 4A, 5A, 6A) to the fixed wing portion 78 (see FIGS. 3A, 4A, 5A, 6A). Load is preferably transferred from the unfixed wing tip portion 76 (see FIGS. 3A, 4A, 5A, 6A) to the fixed wing portion 78 (see FIGS. 3A, 4A, 5A, 6A) via the dual load path structure 83 (see FIGS. 3A, 4B, 5B, 6A) to provide fail-safe load paths 160 (see FIG. 3A) for primary load carrying members, such as the wings 18 (see FIGS. 1, 3A, 4A, 5A, 6A) of the air vehicle 10 (see FIGS. 1, 3A). As discussed above, "fail-safe" means a structure, system, assembly, and/or method having a redundant feature, for example, a redundant load path, which in the event of a failure in one load path to carry the load, a second load path is configured to carry the load. The dual load path structure 83 (see FIGS. 3A, 4B, 5B, 6A) provides two separate load bearing paths to carry a load in a fall-safe manner, one path carrying the load upon failure of the other.

FIG. 3A shows that the dual load path structure 83 comprises dual wing skin plates 104 and a rotation joint 84. The rotation joint 84 (see also FIGS. 4A, 5A, 6A) is preferably coupled between the dual wing skin plates 104 (see also FIGS. 4B, 5B, 7A). The dual wing skin plates 104 (see FIGS. 4B, 5B, 7A) preferably comprise wing skins 106 (see FIGS. 3A, 4B, 5B, 7A), such as upper wing skin 106a (see FIGS. 3A, 4B, 5B, 7A) and lower wing skin 106b (see FIGS. 3A, 4B, 5B, 7A). Each wing skin 106 (see FIGS. 3A, 4B, 5B, 7A) preferably has a plate portion 108 (see FIGS. 3A, 4B, 5B) attached to the wing skin 106 (see FIGS. 3A, 4B, 5B). The plate portion 108 (see FIGS. 3A, 4B, 5B) is preferably a titanium plate portion 108a (see FIGS. 3A, 4B, 5B). However, another suitably strong metal or hard material may be used for the plate portion.

The upper and lower wing skins 106a, 106b may be mechanically attached or bonded to wing members 70 (see FIGS. 3A, 4A, 5A, 6A), such as front wing spar 70a (see FIGS. 3A, 4A, 5A, 6A) and rear wing spar 70b (see FIGS. 3A, 4A, 5A, 6A), and to wing ribs 68 (see FIGS. 3A, 4A, 5F), such as fixed wing rib 68a (see FIG. 5F), to improve the strength and stability of the wing skins 106.

As further shown in FIG. 3A, the rotation joint 84 comprises dual rotation elements 86 and a dual rotation pin element 88. The rotation joint 84 (see FIGS. 3A, 4A, 5A, 6A) is preferably configured to rotationally couple the unfixed wing tip portion 76 (see FIGS. 3A, 4A, 5A, 6A) to the fixed wing portion 78 (see FIGS. 3A, 4A, 5A, 6A). The rotation joint 84 (see FIGS. 3A, 4A, 5A, 6A) preferably comprises a dual rotation pin element 88 (see FIGS. 3A, 4A, 5A, 6A) having a center rotation axis 90 (see FIGS. 3A, 4B, 5B, 6A) and dual rotation elements 86 (see FIGS. 3A, 4A, 5A, 6A) configured to rotate about the center rotation axis 90 (see FIGS. 3A, 4B, 5B, 6A).

The dual rotation pin element 88 (see FIGS. 3A, 4A, 5A, 6A) preferably comprises, for example but without limitation, one of a disc pin 88a (see FIGS. 3A, 4A), a pivot pin 88b (see FIGS. 3A, 5A), a plate pin 88c (see FIGS. 3A, 6A), or another suitable rotation or pivot pin or element.

The dual rotation elements 86 (see FIGS. 3A, 4A, 5A, 6A) preferably comprise, for example but without limitation, one of lug elements such as first lug element 86a (see FIGS. 3A, 4A) and second lug element 86b (see FIGS. 3A, 4A), rotation fitting elements 86c (see FIGS. 3A, 5A), rotation plate elements 86d (see FIGS. 3A, 6A), or another suitable rotation element.

Figure 4A:
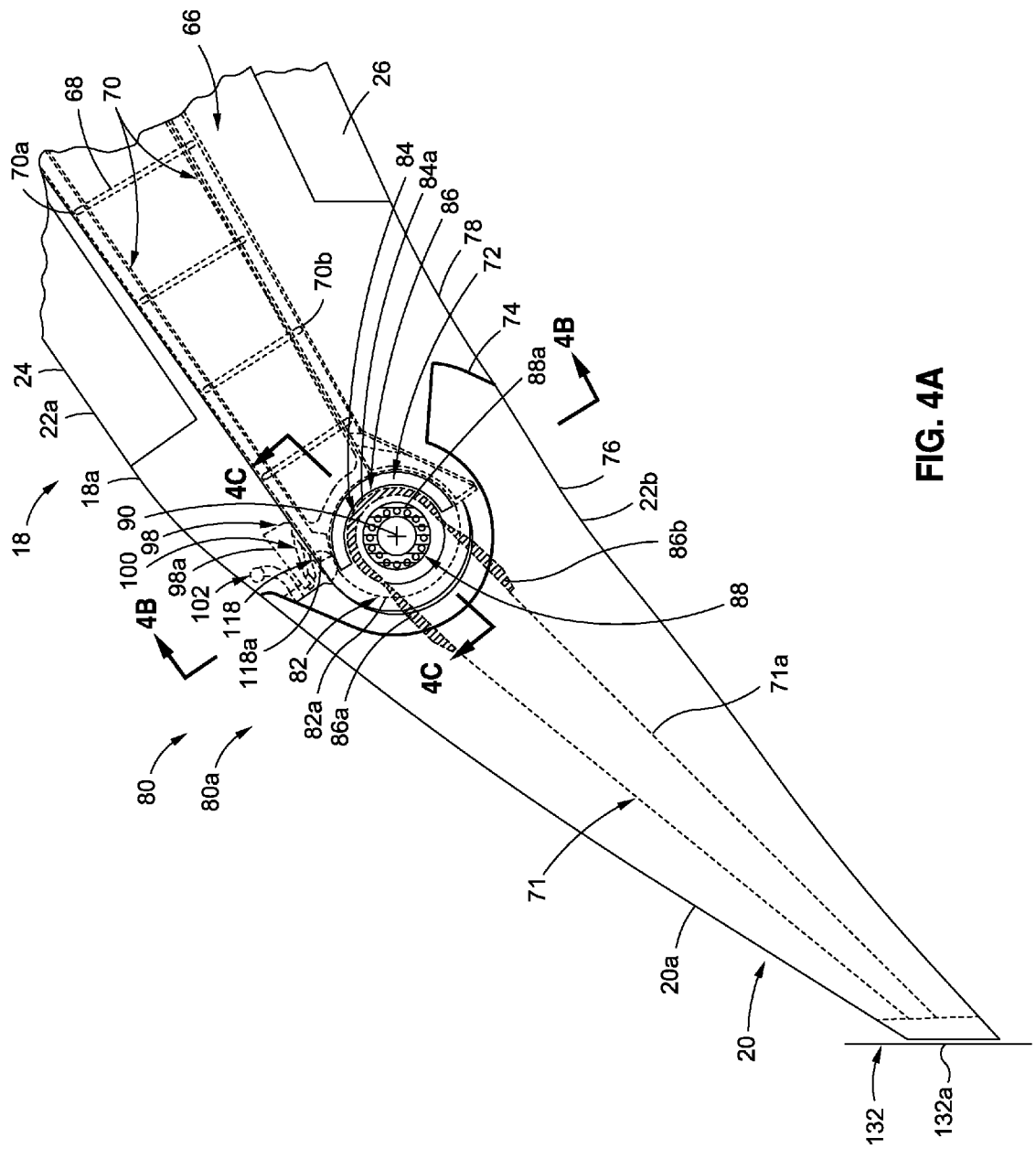
FIG. 4A is an illustration of a cutaway top plan view of a wing in an unfolded flight position having an embodiment of a swing wing tip system and a swing wing tip assembly according to the disclosure.
Figure 4B:
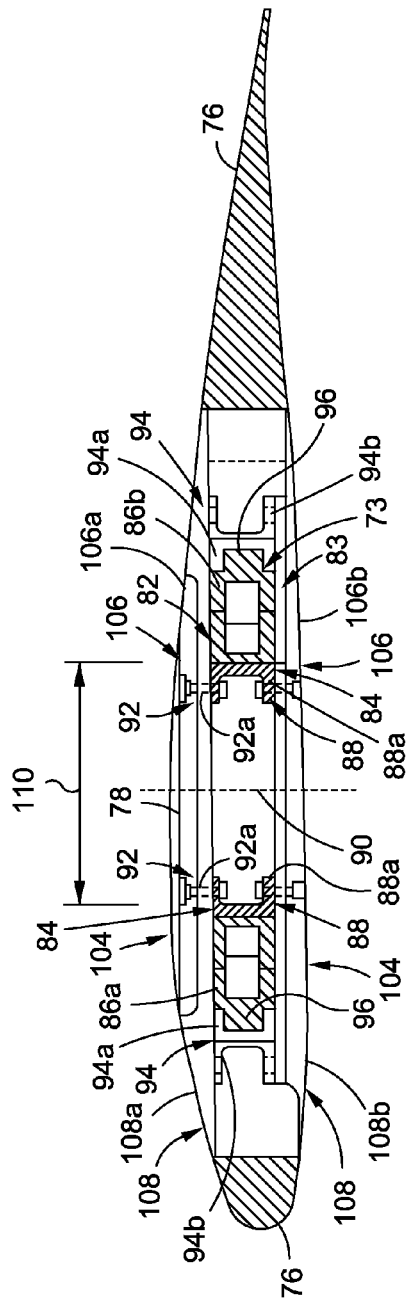
FIG. 4B is an illustration of a cross-sectional view taken along lines 4B-4B of FIG. 4A.
Figure 4C:
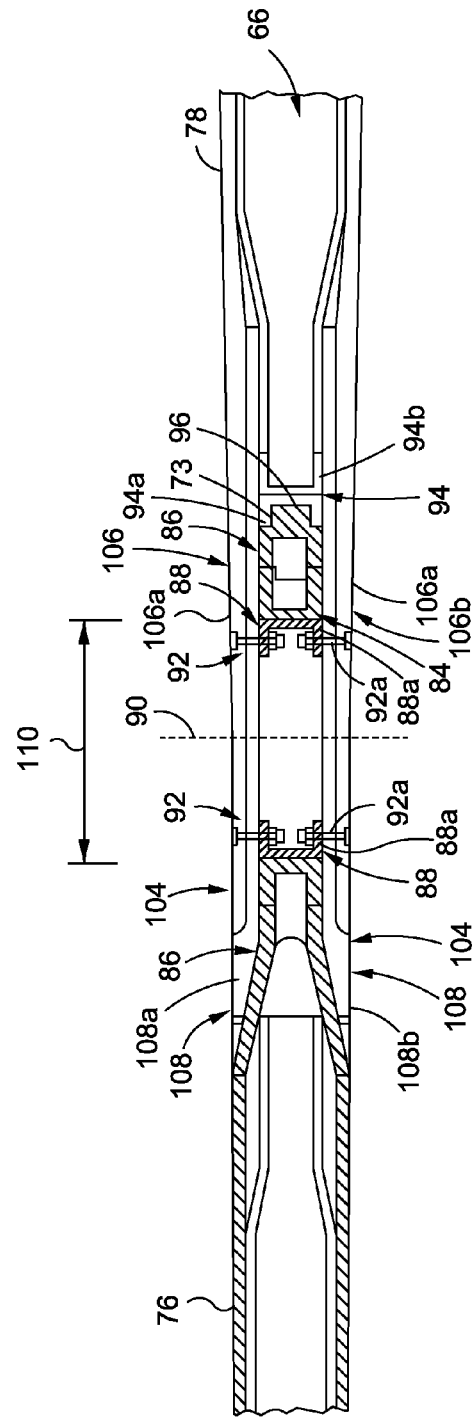
FIG. 4C is an illustration of a cross-sectional view taken along lines 4C-4C of FIG. 4A.

The dual load path structure 83 (see FIGS. 3A, 4B, 5B, 6A) may further comprise dual channel segments 94 (see FIGS. 4B-4C) coupled between the dual wing skin plates 104 (see FIGS. 4B-4C). As shown in FIGS. 4B-4C, the dual channel segments 94 may comprise first dual channel segment 94a and second dual channel segment 94b. The dual load path structure 83 (see FIG. 3A) may further comprise additional suitable redundant structures.

As shown in FIG. 3A, the swing wing tip system 80 may further comprise a navigation element 102. The navigation element 102 may comprise a retractable navigation light 102a (see also FIG. 4D) or another suitable navigation or positioning element to facilitate navigation and guidance of the air vehicle 10 (see FIG. 1) such as on an airport runway or taxiway.

Figure 4D:
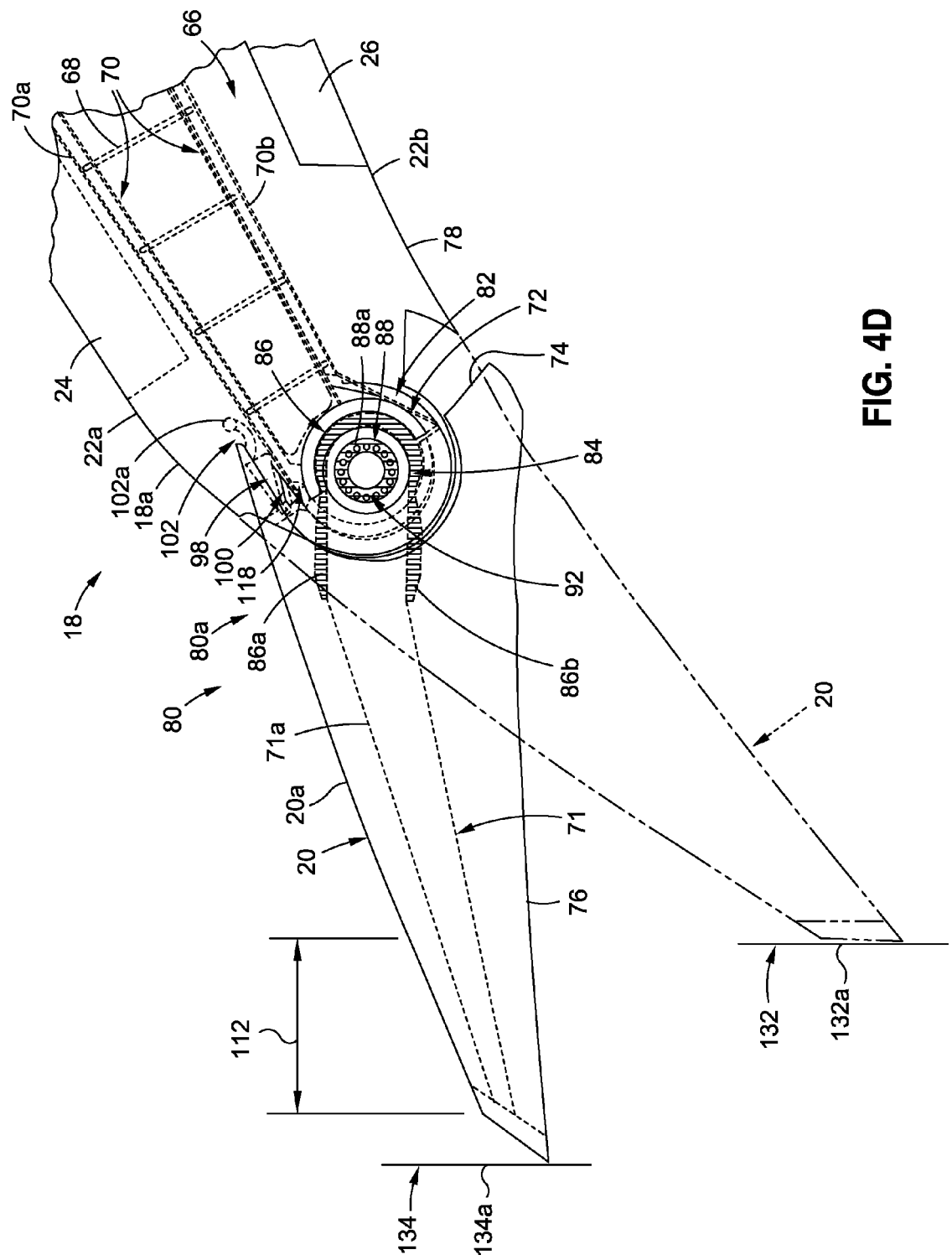
FIG. 4D is an illustration of a cutaway top plan view of the wing of FIG. 4A showing forward rotation from an unfolded flight position to a forward folded flight position.
Figure 4E:
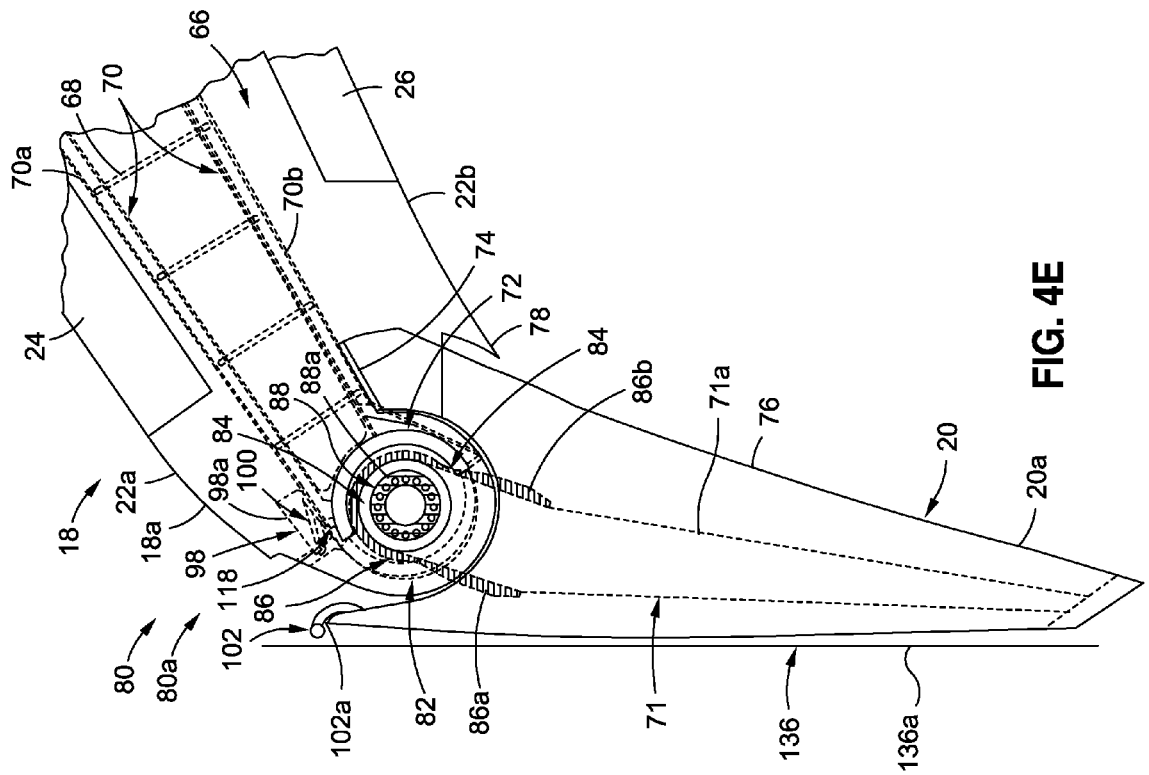
FIG. 4E is an illustration of a cutaway top plan view of the wing of FIG. 4A in an aft folded ground position.
Figure 5B:
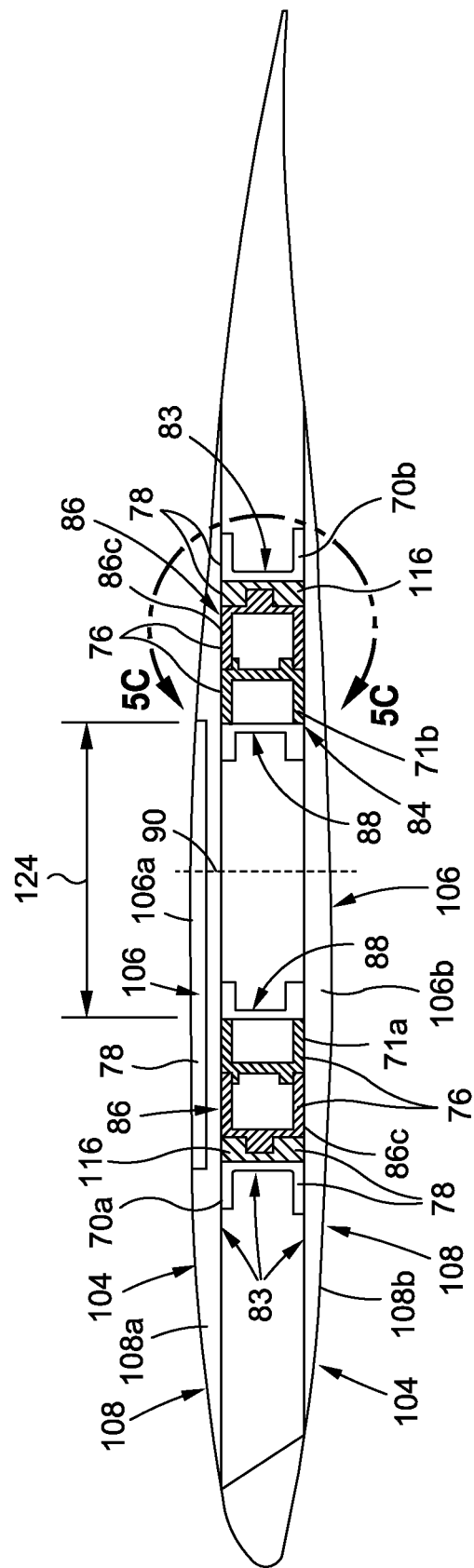
FIG. 5B is an illustration of a cross-sectional view taken along lines 5B-5B of FIG. 5A.
Figure 5F:
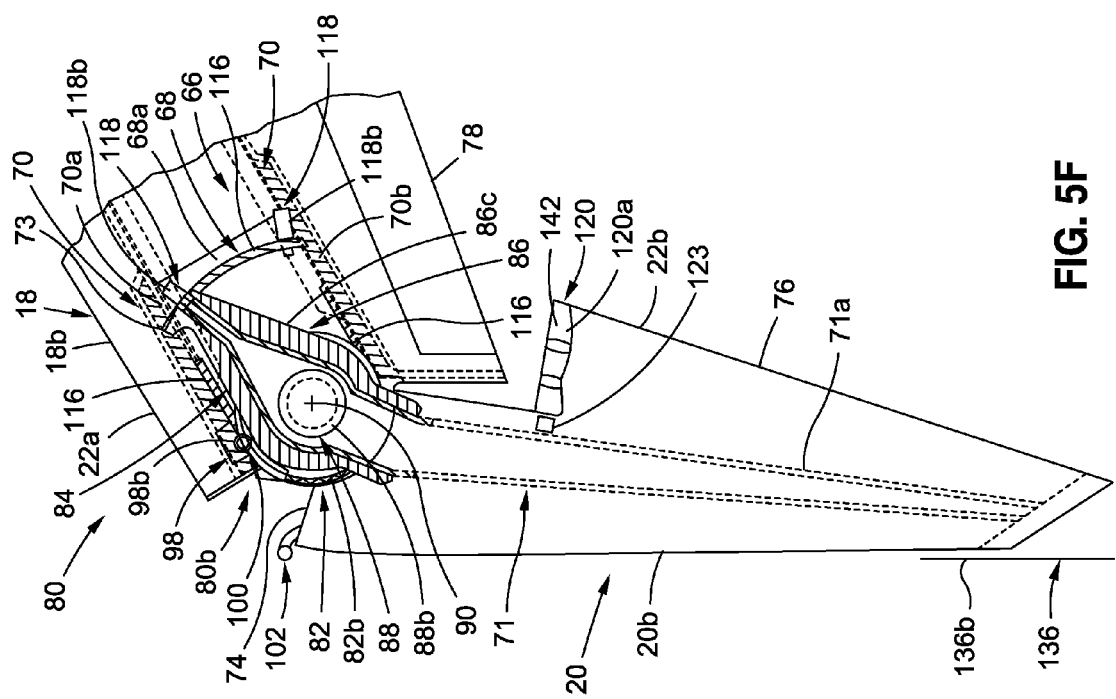
FIG. 5F is an illustration of a cutaway top plan view of the wing of FIG. 5A in an aft folded ground position.
Figure 6A:
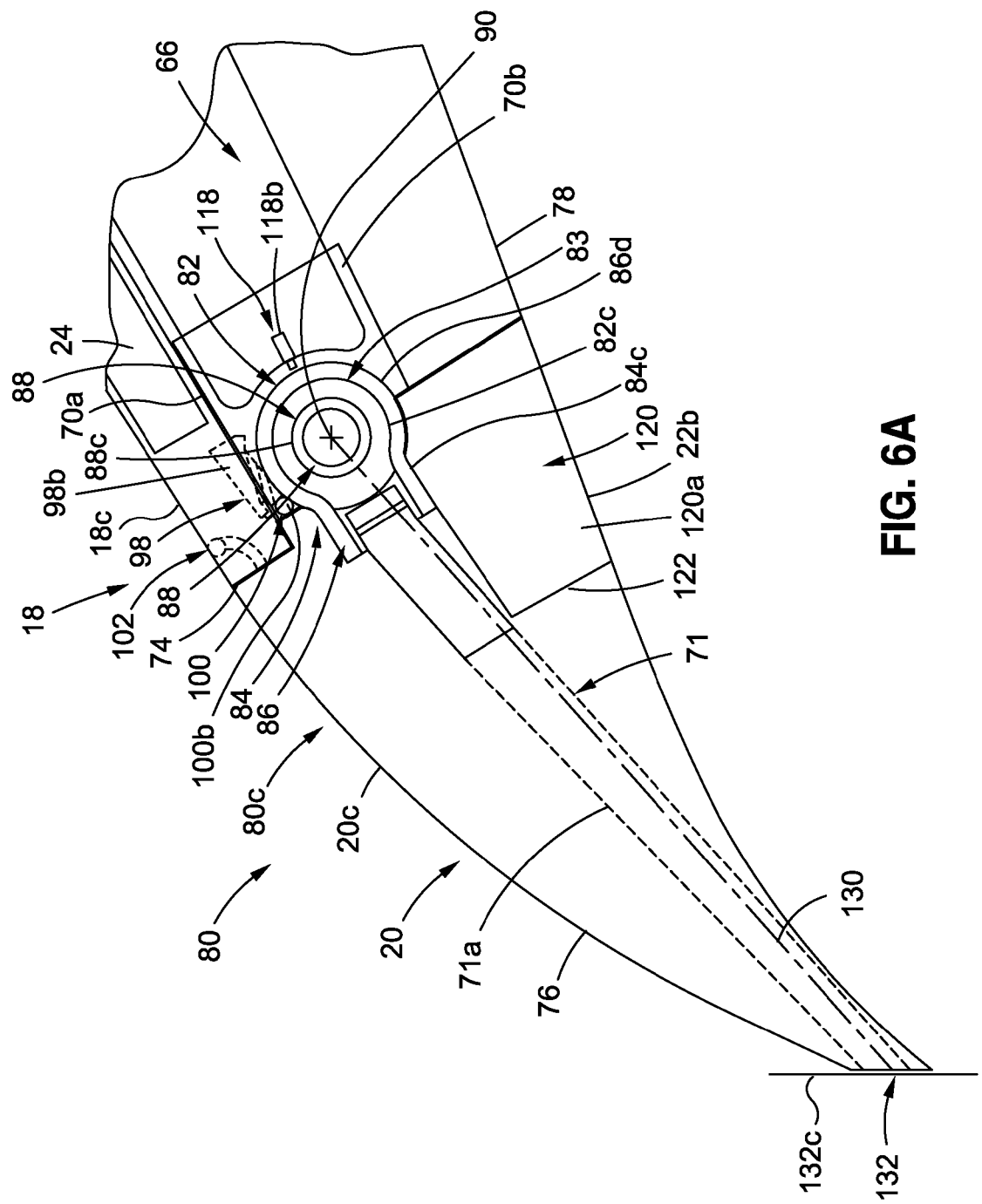
FIG. 6A is an illustration of a cutaway top plan view of a wing in an unfolded flight position having yet another embodiment of a swing wing tip system and a swing wing tip assembly according to the disclosure.

As shown in FIGS. 3A-3B, the swing wing tip system 80 (see also FIGS. 4A, 5A, 6A) further comprises the actuator assembly 98 (see also FIGS. 4A, 5A, 6A) operatively coupled to the rotation joint 84 (see also FIGS. 4A, 5A, 6A) to actuate the rotation joint 84 (see also FIGS. 4A, 5A, 6A). This enables rotation of the unfixed wing tip portion 76 (see also FIGS. 4A, 5A, 6A) with respect to the fixed wing portion 78 (see also FIGS. 4A, 5A, 6A) about the center rotation axis 90 (see also FIGS. 4B, 5B, 6A) at a selected operation condition 131 (see FIG. 3A). The selected operation condition 131 (see FIG. 3A) may provide a position of the unfixed wing tip portion 76 (see FIGS. 3A, 4A, 5A, 6A) comprising one of an unfolded flight position 132 (see FIGS. 4A, 5A, 6A), a rotation position 162 (see FIG. 3A) of an aft folded ground position 136 (see FIGS. 4E, 5F, 6C), a rotation position 162 of a forward folded flight position 134 (see FIG. 4D), or another suitable selected operation condition 131.

Increasing the wingspan 21 (see FIG. 1) by using the rotation joint 84 (see FIGS. 4A, 5A, 6A) may provide structural integrity whether the unfixed wing tip portion 76 (see FIGS. 4A, 5A, 6A) of the wing 18 (see FIGS. 4A, 5A, 6A) is in the unfolded flight position 132 (see FIGS. 4A, 5A, 6A) and optimized for high speed, or is in the aft folded ground position 136 (see FIGS. 4E, 5F) during taxi and runway travel or during gate parking maneuvers. In one embodiment, as shown in FIG. 4D and discussed in further detail below, the unfixed wing tip portion 76 of the wing 18 may also rotate or fold forward in a forward folded flight position 134, such as forward folded take-off and climb position 134a, which is a position optimized for low speed flight conditions.

The unfixed wing tip portion 76 (see FIGS. 3A, 4A, 5A, 6A) of the wing 18 (see FIGS. 3A, 4A, 5A, 6A) may be deployed by the rotation joint 84 (see FIGS. 3A, 4A, 5A, 6A) from the fixed wing portion 78 (see FIGS. 3A, 4A, 5A, 6A) through a plurality of positions. The positions may include positioning the unfixed wing tip portion 76 (see FIGS. 4A, 5A, 6A) at the unfolded flight position 132 (see FIGS. 4A, 5A, 6A), which is preferably extended and at high speed, and may move through intermediate positions to the rotated or deployed position. The rotated or deployed position may comprise positioning the unfixed wing tip portion 76 (see FIGS. 4A, 5A, 6A) at, for example but without limitation, the forward folded flight position 134 (see FIG. 4D) at low speed; the aft folded ground position 136 (see FIGS. 4E, 5F) at low speed on airport runways and taxiways and during gate parking maneuvers; or other deployed positions.

As shown in FIG. 3B, the actuator assembly 98 may comprise, for example but without limitation, one of a rotary electric actuator assembly 98a, a linear hydraulic actuator assembly 98b, a ball screw actuator assembly 98c, or another suitable actuator assembly. Preferably, as shown in FIG. 3B, the actuator assembly 98 comprises an actuator element 100 and a locking element 118. As shown in FIG. 3B, the actuator element 100 may comprise, for example but without limitation, a rotary electric actuator 100a, a linear hydraulic actuator 100b, a ball screw actuator 100c, or another suitable actuator.

As further shown in FIG. 3B, the locking element 118 may comprise, for example but without limitation, a rack and pinion element 118a, a latch hydraulic pin locking element 118b, a ball screw locking element 118c, or another suitable locking element. The locking element 118 (see FIG. 3B) is preferably configured to lock the unfixed wing tip portion 76 (see FIG. 3A) in a rotation position 162 (see FIG. 3A) relative to the fixed wing portion 78 (see FIG. 3A) when the actuator element 100 (see FIG. 3B) actuates the rotation joint 84 (see FIG. 3A). In a rotation position 162 (see FIG. 3A), such as the forward folded flight position 134 (see FIG. 4D) or the aft folded ground position 136 (see FIG. 4E), the locking element 118 (see FIGS. 4D, 4E) may be coupled to the rotation joint 84 (see FIGS. 4D, 4E) to secure the unfixed wing tip portion 76 (see FIGS. 3A, 4A, 5A, 6A) in place.

The actuator element 100 (see FIGS. 3A, 4A, 5A, 6A) is preferably configured to produce a rotating motion in response to an actuation command to actuate the rotation joint 84 (see FIGS. 3A, 4A, 5A, 6A) for rotating the unfixed wing tip portion 76 (see FIGS. 3A, 4A, 5A, 6A) with respect to the fixed wing portion 78 (see FIGS. 3A, 4A, 5A, 6A) about the center rotation axis 90 (see FIGS. 3A, 4B, 5B, 6A).

As shown in FIG. 3A, the swing wing tip system 80 further comprises a controller system 150 operatively coupled to the actuator assembly 98 to control the actuator assembly 98 to actuate the rotation joint 84 and rotation of the unfixed wing tip portion 76 according to various operation conditions 131. In operation, the controller system 150 (see FIGS. 3A-3B) may control the rotation joint 84 (see FIG. 3A) by sending an actuation command from the actuator element 100 (see FIG. 3B) to the rotation joint 84 (see FIG. 3A), thereby swinging/rotating the unfixed wing tip portion 76 (see FIG. 3A) of the swing wing tip assembly 82 (see FIG. 3A) in response to the actuation command.

The operation conditions 131 (see FIG. 3B) may comprise, for example but without limitation, flight conditions, ground operations, or other conditions. The flight conditions may comprise, for example but without limitation, take-off, cruise, approach, landing, or other flight conditions. The ground operations may comprise, for example but without limitation, air breaking after landing, taxing, parking, or other ground operations. The controller system 150 (see FIG. 3B) may be coupled directly to the rotation joint 84 (see FIG. 3A) via connection elements such as wires (not shown), or the controller system 150 (see FIG. 3B) may be coupled wirelessly to and located remotely from the rotation joint 84 (see FIG. 3A).

As shown in FIG. 3B, the controller system 150 may comprise, for example but without limitation, a power source 152, a processor device 154, a data storage device 156, and software 158. The controller system 150 (see FIG. 3B) may be implemented as, for example but without limitation, a part of an aircraft system, a subsystem processor comprising hardware and/or software for the controller system 150, a central aircraft processor, or another suitable processor.

The processor device 154 (see FIG. 3B) may comprise, for example but without limitation, a computer 154a (see FIG. 3B), a microprocessor, a digital signal processor, or another suitable processor device. The processor device 154 (see FIG. 3B) preferably has memory to store and provide data to the controller system 150 (see FIG. 3B). Data such as flight configuration data, operation conditions 131 (see FIG. 3B), rotation position 162 (see FIG. 3A) of the unfixed wing tip portion 76 (see FIG. 3A), or other data may be stored in the data storage device 156 (see FIG. 3B). The data storage device 156 (see FIG. 3B) may comprise hard disks, optical disks, random access storage devices, or other suitable known data storage devices.

FIG. 4A is an illustration of a cutaway top plan view of wing 18, such as in the form of swing wing 18a, having wing tip 20, such as in the form of swing wing tip 20a. More specifically, FIG. 4A is a top plan view, with wing skin cutaway, of selected interior components of swing wing tip system 80 depicted in accordance with an illustrative embodiment.

As shown in FIG. 4A, the wing 18 is in an unfolded flight position 132, such as an unfolded cruise position 132a, and has a leading edge 22a and a trailing edge 22b. In the unfolded flight position 132, such as in the unfolded cruise position 132a, the wing 18 is preferably optimized for high speed performance. As further shown in FIG. 4A, the wing 18 has an embodiment of the swing wing tip system 80, such as swing wing tip system 80a, and an embodiment of the swing wing tip assembly 82, such as swing wing tip assembly 82a, according to the disclosure.

As shown in FIG. 4A, the swing wing tip assembly 82, such as swing wing tip assembly 82a, comprises the unfixed wing tip portion 76 movably connected to the fixed wing portion 78 via the rotation joint 84 and separated at hinge line 74. The unfixed wing tip portion 76 may be maintained in line with the fixed wing portion 78 in the unfolded flight position 132 and without rotation during the high speed flight condition.

The unfixed wing tip portion 76 (see FIG. 4A) may include one or more wing tip members 71 (see FIG. 4A), such as one or more wing tip spars 71a (see FIG. 4A). The fixed wing portion 78 (see FIG. 4A) may comprise a wing box 66 (see FIG. 4A) extending from an inboard to outboard direction and having wing members 70 (see FIG. 4A), such as front wing spar 70a and rear wing spar 70b (see FIG. 4A), one or more wing ribs 68 (see FIG. 4A), a slat 24 (see FIG. 4A), an aileron 26 (see FIG. 4A), or other suitable structures.

In this exemplary embodiment of the swing wing tip assembly 82 shown in FIG. 4A, the rotation joint 84, such as in the form of rotation joint 84a, comprises a dual rotation pin element 88, in the form of a disc pin 88a, having a center rotation axis 90, and comprises dual rotation elements 86, such as in the form of first lug element 86a and second lug element 86b. The first lug element 86a and the second lug element 86b are configured to rotate about the center rotation axis 90.

In this exemplary embodiment of the swing wing tip system 80 shown in FIG. 4A, the actuator assembly 98 comprises a rotary electric actuator assembly 98a having an actuator element 100 and a locking element 118. The locking element 118 may comprise a rack and pinion element 118a (see FIG. 4A) to lock the rotation joint 84 (see FIG. 4A) in place, and in turn, the unfixed wing tip portion 76 (see FIG. 4A) in place, after the rotation joint 84 (see FIG. 4A) is actuated by the actuator element 100 (see FIG. 4A) to rotate. Alternatively, the actuator assembly 98, actuator element 100 and locking element 118 may comprise other suitable assemblies or elements.

FIG. 4A further shows a shear load path 72 partially around the perimeter of the rotation joint 84. In addition, FIG. 4A shows a navigation element 102 enclosed within the wing 18. The navigation element 102 (see FIG. 4A) may be positioned near a hinge line 74 (see FIG. 4A) between the fixed wing portion 78 (see FIG. 4A) and the unfixed wing tip portion 76 (see FIG. 4A). The navigation element 102 (see FIG. 4A) may be exposed and activated in response to rotation of the unfixed wing tip portion 76 (see FIG. 4A).

FIG. 4B is an illustration of a cross-sectional view taken along lines 4B-4B of FIG. 4A. FIG. 4B shows that the dual load path structure 83 configured to transfer load from the unfixed wing tip portion 76 to the fixed wing portion 78 at a shear load transfer point 73. At the shear load transfer point 73 (see FIG. 4B) of this embodiment of the swing wing tip assembly 82 (see FIG. 4B), about a 200 (two hundred) degree arc length shear load transfer capability may be directed from the unfixed wing tip portion 76 (see FIG. 4B) to the fixed wing portion 78 (see FIG. 4B) at the rotation joint 84 (see FIG. 4B). However, other suitable arc lengths of shear load transfer capability may also be obtained.

As shown in FIG. 4B, the dual load path structure 83 comprises dual wing skin plates 104 and the rotation joint 84. The rotation joint 84 (see FIG. 4B) is preferably coupled between the dual wing skin plates 104 (see FIG. 4B). As further shown in FIG. 4B, the dual wing skin plates 104 preferably comprise wing skins 106, such as upper wing skin 106a and lower wing skin 106b. As further shown in FIG. 4B, each wing skin 106 preferably has a plate portion 108, such as in the form of a titanium plate portions 108a, 108b, respectively, attached to the wing skin 106. However, another suitably strong metal or hard material may be used for the plate portion.

The embodiment of the rotation joint 84 of the swing wing tip assembly 82 shown in FIG. 4B comprises dual rotation elements 86, such as in the form of first lug element 86a and second lug element 86b. As further shown in FIG. 4B, the rotation joint 84 comprises dual rotation pin element 88, such as in the form of disc pin 88a having the center rotation axis 90, such as a center vertical rotation axis. A diameter 110 of the dual rotation pin element 88 is shown in FIG. 4B, and such diameter 110 may be, for example, 15 (fifteen) inches, or another suitable length. As shown in FIG. 4B, the dual rotation pin element 88 is preferably adjacent the first lug element 86a and the second lug element 86b. As further shown in FIG. 4B, dual wing skin plates 104 may be attached to the dual rotation pin element 88 via attachment elements 92, such as bolts 92a. However, other suitable attachment elements 92 or bonding may also be used.

The dual wing skin plates 104 (see FIG. 4B) may act as upper and lower dual devises with the first lug element 86a and second lug element 86b. In addition, positioning the dual rotation pin element 88 (see FIG. 4B) between the dual wing skin plates 104 (see FIG. 4B), i.e., dual devises, may provide replaceability of the unfixed wing tip portion 76 (see FIG. 4B) in a manner similar to replaceability of known winglets while still providing substantial torsional stiffness of the rotation joint 84 (see FIG. 4B). Thus, a minimum maintenance may be performed as compared to winglet or wing configurations that allow no access or no maintenance.

As shown in FIG. 4B, the dual load path structure 83 may further comprise dual channel segments 94, such as first channel segment 94a and second channel segment 94b, coupled between the dual wing skin plates 104. As further shown in FIG. 4B, the first channel segment 94a and second channel segment 94b are shown in a back-to-back configuration and are preferably wing box dual channel segments. As further shown in FIG. 4B, the first lug element 86a and the first channel segment 94a form a tongue and groove configuration 96, and the second lug element 86b and the first channel segment 94a form another tongue and groove configuration 96.

FIG. 4C is an illustration of a cross-sectional view taken along lines 4C-4C of FIG. 4A. FIG. 4C shows the shear load transfer point 73 that transfers load from the unfixed wing tip portion 76 to the fixed wing portion 78. FIG. 4C further shows the dual wing skin plates 104 comprising wing skins 106, such as upper wing skin 106a and lower wing skin 106b. As further shown in FIG. 4C, each wing skin 106 preferably has a plate portion 108, such as in the form of titanium plate portions 108a, 108b, respectively, attached to the wing skin 106.

FIG. 4C further shows and the rotation joint 84 comprising dual rotation elements 86 and dual rotation pin element 88 having the center rotation axis 90, such as a center vertical rotation axis. The diameter 110 of the dual rotation pin element 88 is shown in FIG. 4C. As further shown in FIG. 4C, the dual wing skin plates 104 may be attached to the dual rotation pin element 88 via attachment elements 92, such as bolts 92a.

As further shown in FIG. 4C, the dual channel segments 94 of the wing box 66, such as first channel segment 94a and second channel segment 94b, are coupled between the dual wing skin plates 104. As further shown in FIG. 4C, the first channel segment 94a and the dual rotation element 86 form the tongue and groove configuration 96.

FIG. 4D is an illustration of a cutaway top plan view of the wing 18, such as in the form of swing wing 18a, of FIG. 4A. FIG. 4D shows forward rotation of the wing tip 20, such as in the form of swing wing tip 20a, from an unfolded flight position 132, such as an unfolded cruise condition 132a, to a forward folded flight position 134, such as forward folded take-off and climb position 134a. In the forward folded flight position 134, the wing 18 is preferably optimized for low speed performance.

Additional wingspan length 112 (see FIG. 4D) is shown at the unfixed wing tip portion 76. Such additional wingspan length 112 may be eight (8) feet or more to enhance take-off and climb performance when the unfixed wing tip portion 76 is folded or swept forward thirty (30) degrees at take-off.

As shown in FIG. 4D, the wing 18 has an embodiment of the swing wing tip system 80, such as swing wing tip system 80a, and an embodiment of the swing wing tip assembly 82. As further shown in FIG. 4D, the wing 18 has a leading edge 22a, a trailing edge 22b, unfixed wing tip portion 76 having one or more wing tip members 71, such as one or more wing tip spars 71a, fixed wing portion 78 having wing box 66, wing members 70, such as front wing spar 70a and rear wing spar 70b, one or more wing ribs 68, slat 24, and aileron 26.

As shown in FIG. 4D, the hinge line 74 is separated between the unfixed wing tip portion 76 and the fixed wing portion 78, and the dual rotation elements 86, such as in the form of first lug element 86a and second lug element 86b, of the rotation joint 84 are rotated forward about the dual rotation pin element 88, in the form of a disc pin 88a. Attachment elements 92 (see FIG. 4D) are shown attached to the dual rotation pin element 88 (see FIG. 4D).

FIG. 4D further shows actuator assembly 98 with actuator element 100 and locking element 118, and shows navigation element 102, such as in the form of retractable navigation light 102a. FIG. 4D further shows shear load path 72.

FIG. 4E is an illustration of a cutaway top plan view of the wing 18, such as in the form of swing wing 18a, of FIG. 4A. FIG. 4E shows the wing tip 20, such as in the form of swing wing tip 20a, in an aft folded ground position 136, such as an aft folded taxiing and runway ground position 136a. In the aft folded ground position 136, the wing 18 is preferably optimized for low speed performance, and the unfixed wing tip portion 76 may be rotated approximately 35 (thirty-five) degrees in an aft direction.

As shown in FIG. 4E, the wing 18 has an embodiment of the swing wing tip system 80, such as swing wing tip system 80a, and an embodiment of the swing wing tip assembly 82. As further shown in FIG. 4E, the wing 18 has leading edge 22a, trailing edge 22b, unfixed wing tip portion 76 having one or more wing tip members 71, such as one or more wing tip spars 71a, fixed wing portion 78 having wing box 66, wing members 70, such as front wing spar 70a and rear wing spar 70b, one or more wing ribs 68, slat 24, and aileron 26.

As shown in FIG. 4E, the hinge line 74 is separated between the unfixed wing tip portion 76 and the fixed wing portion 78, and the dual rotation elements 86, such as in the form of first lug element 86a and second lug element 86b, of the rotation joint 84 are rotated aft about the dual rotation pin element 88, such as in the form of a disc pin 88a.

FIG. 4E further shows actuator assembly 98, such as in the form of rotary electric actuator assembly 98a, with actuator element 100 and locking element 118. FIG. 4E further shows navigation element 102, such as in the form of retractable navigation light 102a, and shear load path 72.

FIG. 5A is an illustration of a cutaway top plan view of a wing 18, such as swing wing 18b, having wing tip 20, such as in the form of swing wing tip 20b. More specifically, FIG. 5A is a top plan view, with wing skin cutaway, of selected interior components of swing wing tip system 80 depicted in accordance with an illustrative embodiment.

As shown in FIG. 5A, the wing 18 is in an unfolded flight position 132, such as an unfolded cruise position 132b, and has a leading edge 22a and a trailing edge 22b. In the unfolded flight position 132, such as in the unfolded cruise position 132b, the wing 18 is preferably optimized for high speed performance. As further shown in FIG. 5A, the wing 18 has an embodiment of the swing wing tip system 80, such as swing wing tip system 80b, and an embodiment of the swing wing tip assembly 82, such as swing wing tip assembly 82b, according to the disclosure.

As shown in FIG. 5A, the swing wing tip assembly 82, such as swing wing tip assembly 82b, comprises the unfixed wing tip portion 76 movably connected to the fixed wing portion 78 via the rotation joint 84 and separated at hinge line 74. The unfixed wing tip portion 76 may be maintained in line with the fixed wing portion 78 in the unfolded flight position 132 and without rotation during the high speed flight condition.

The unfixed wing tip portion 76 (see FIG. 5A) may include one or more wing tip members 71 (see FIG. 5A), such as one or more wing tip spars 71a (see FIG. 5A). The fixed wing portion 78 (see FIG. 5A) may comprise a wing box 66 (see FIG. 5A) extending from an inboard to outboard direction and having wing members 70 (see FIG. 5A), such as front wing spar 70a and rear wing spar 70b (see FIG. 5A), one or more wing ribs 68 (see FIG. 5A), such as one or more fixed wing ribs 68a (see FIG. 5A), slat 24 (see FIG. 5A), aileron 26 (see FIG. 5A), or other suitable structures.

In this exemplary embodiment of the swing wing tip assembly 82 shown in FIG. 5A, the rotation joint 84, such as in the form of rotation joint 84b, comprises a dual rotation pin element 88, in the form of pivot pin 88b, having the center rotation axis 90. As further shown in FIG. 5A, the rotation joint 84 comprises dual rotation element 86, such as in the form of rotation fitting element 86c. The rotation fitting element 86c (see FIG. 5A) is configured to rotate about the pivot pin 88b and the center rotation axis 90 (see FIG. 5A). Further, as shown in FIG. 5A, the rotation fitting element 86c rotates or pivots between and along tracks 116. A tip portion 87 (see FIG. 5E) of rotation fitting element 86c (see FIG. 5A) preferably rotates along a curved portion of track 116 (see FIG. 5A) adjacent wing rib 68 (see FIG. 5A).

In this exemplary embodiment of the swing wing tip system 80 shown in FIG. 5A, the actuator assembly 98 comprises a linear hydraulic actuator assembly 98b having an actuator element 100 and locking elements 118. The locking elements 118 may be in the form of a latch hydraulic pin locking element 118b (see FIG. 5A) to lock the rotation joint 84 (see FIG. 5A) in place, and in turn, the unfixed wing tip portion 76 (see FIG. 5A) in place, after the rotation joint 84 (see FIG. 5A) is actuated by the actuator element 100 (see FIG. 5A) to rotate. Alternatively, the actuator assembly 98, actuator element 100, and locking element 118 may comprise other suitable assemblies or elements.

FIG. 5A further shows a navigation element 102 enclosed within the wing 18. The navigation element 102 (see FIG. 5A) may be positioned near the hinge line 74 (see FIG. 5A) between the fixed wing portion 78 (see FIG. 5A) and the unfixed wing tip portion 76 (see FIG. 5A). The navigation element 102 (see FIG. 5A) may be exposed and activated in response to rotation of the unfixed wing tip portion 76 (see FIG. 5A).

In this exemplary embodiment of the swing wing tip system 80 shown in FIG. 5A, the wing 18 further comprises a moving panel 120 positioned near the trailing edge 22b of wing 18, such as near the unfixed wing tip portion 76. The moving panel 120 (see FIG. 5A) is preferably configured to move before the unfixed wing tip portion 76 (see FIG. 5A) is rotated. The moving panel 120 (see FIG. 5A) may comprise, for example but without limitation, a folding door 120a (see FIG. 5A) in a folded up configuration 140 (see FIG. 5A) or other suitable movable panel or surface configuration.

When the unfixed wing tip portion 76 (see FIG. 5A) is unfolded and not rotated, the moving panel 120 is preferably in the folded up configuration 140 (see FIG. 5A). The moving panel 120 (see FIG. 5A) may drop down or fold via a panel actuator mechanism 123 (see FIG. 5A), or another suitable actuator or sliding mechanism. As shown in FIG. 5A, the moving panel 120 is preferably designed to fold or rotate around a hinge line 122 and is designed to drop below the trailing edge 22b of the wing 18, such as near the unfixed wing tip portion 76, before the unfixed wing tip portion 76 is rotated.

FIG. 5B is an illustration of a cross-sectional view taken along lines 5B-5B of FIG. 5A. FIG. 5B shows that the dual load path structure 83 configured to transfer load from the unfixed wing tip portions 76 to the fixed wing portions 78. As shown in FIG. 4B, the dual load path structure 83 comprises dual wing skin plates 104 and the rotation joint 84. The rotation joint 84 (see FIG. 5B) is preferably coupled between the dual wing skin plates 104 (see FIG. 5B). As further shown in FIG. 5B, the dual wing skin plates 104 preferably comprise wing skins 106, such as upper wing skin 106a and lower wing skin 106b. As further shown in FIG. 5B, each wing skin 106 preferably has a plate portion 108, such as in the form of a titanium plate portion 108a, 108b, respectively, attached to the wing skin 106. However, another suitably strong metal or hard material may be used for the plate portion.

The embodiment of the rotation joint 84 of the swing wing tip assembly 82 shown in FIG. 5B comprises dual rotation elements 86, such as in the form of rotation fitting element 86c, and dual rotation pin element 88 in the form of pivot pin 88b (see FIG. 3A) having the center rotation axis 90 such as a center vertical rotation axis. A diameter 124 of the dual rotation pin element 88, such as pivot pin 88b, is shown in FIG. 5B, and such diameter 124 may be, for example, 20 (twenty) inches, or another suitable length. As shown in FIG. 5B, the dual rotation pin element 88 is adjacent each of wing tip spars 71a, 71b. As further shown in FIG. 5B, the dual rotation elements 86, such as in the form of rotation fitting element 86c, are adjacent tracks 116, and tracks 116 are adjacent front wing spar 70a and rear wing spar 70b, respectively.

Figure 5C:
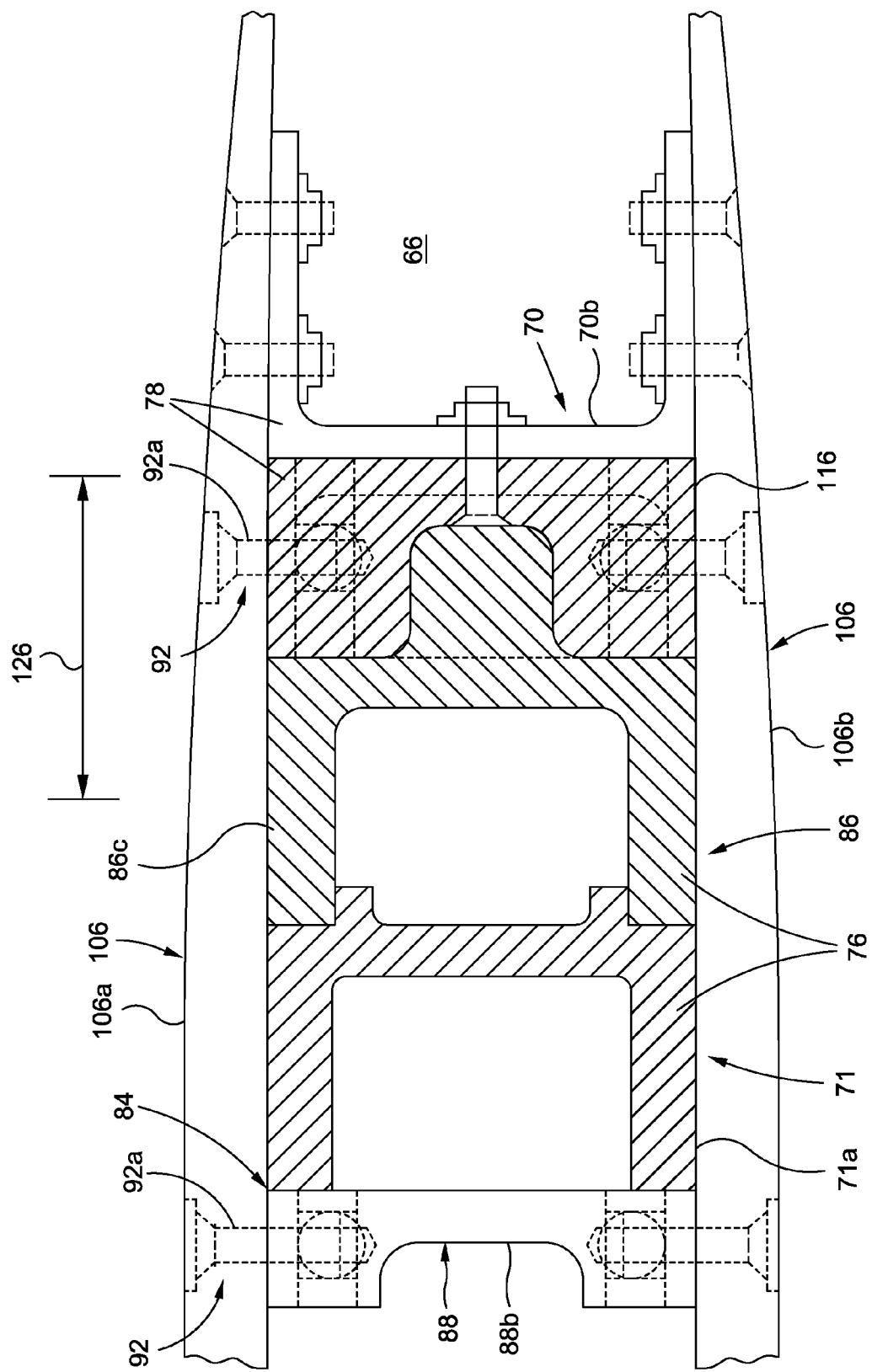
FIG. 5C is an illustration of a close-up view of circle 5C of FIG. 5B.

FIG. 5C is an illustration of a close-up view of circle 5C of FIG. 5B. As shown in FIG. 5C, the rotation joint 84 comprises dual rotation pin element 88, such as pivot pin 88b, and dual rotation elements 86, such as in the form of rotation fitting element 86c. As shown in FIG. 5C, the dual rotation pin element 88 is shown adjacent to wing tip member 71, such as in the form of wing tip spar 71a. As further shown in FIG. 5C, wing tip member 71 is shown adjacent rotation fitting element 86c. As further shown in FIG. 5C, rotation fitting element 86c is shown adjacent track 116. As further shown in FIG. 5C, track 116 is shown adjacent wing member 70, such as rear wing spar 70b of wing box 66.

FIG. 5C further shows the dual rotation pin element 88 and the track 116 attached to wing skins 106, such as upper wing skin 106a and lower wing skin 106b, via attachment elements 92, such as bolts 92a. However, other suitable attachment elements or bonding may also be used. FIG. 5C further shows approximate distance indicated by arrows 126 between rotation fitting element 86c and track 116, which, for example, may be 5 (five) inches or another suitable distance.

Figure 5D:
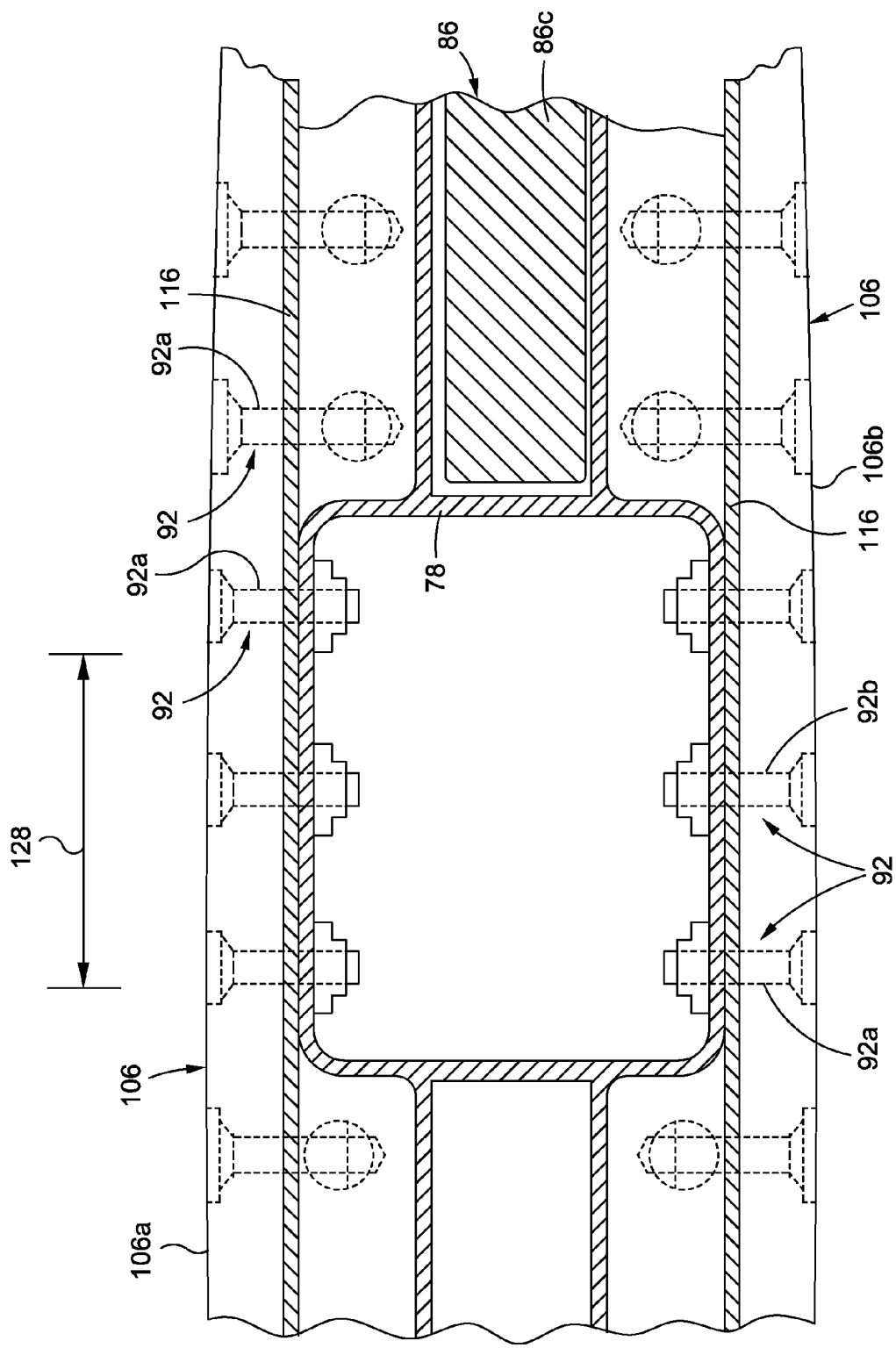
FIG. 5D is an illustration of a close-up cross-sectional view taken along lines 5D-5D of FIG. 5A.

FIG. 5D is an illustration of a close-up cross-sectional view taken along lines 5D-5D of FIG. 5A. As shown in FIG. 5D, dual rotation elements 86, such as in the form of rotation fitting element 86c, is adjacent or near track 116, and is positioned between wing skins 106 which are attached to track 116 via attachment elements 92, such as bolts 92a, or other suitable attachment elements. FIG. 5D further shows approximate distance indicated by arrows 128 along track 116 from rotation fitting element 86c, which, for example, may be 5 (five) inches or another suitable distance.

Figure 5E:
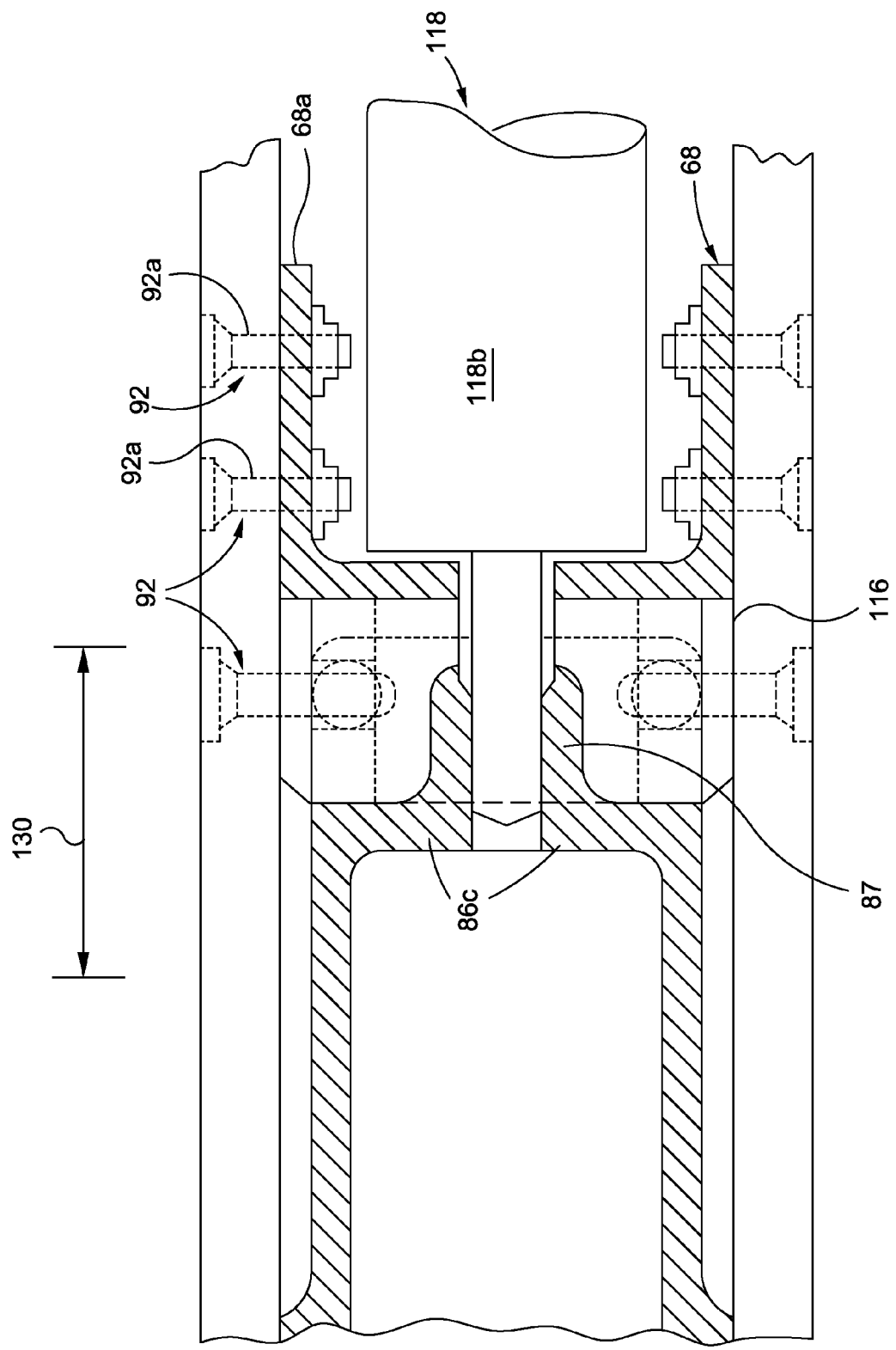
FIG. 5E is an illustration of a close-up cross-sectional view taken along lines 5E-5E of FIG. 5A.

FIG. 5E is an illustration of a close-up cross-sectional view taken along lines 5E-5E of FIG. 5A. As shown in FIG. 5E, the locking element 118, such as in the form of latch hydraulic pin locking element 118b, is inserted through and attaches together wing rib 68, such as in the form of fixed wing fib 68a, track 116, and the tip portion 87 of the rotation fitting element 86c. FIG. 5E further shows the wing rib 68 and the track 116 attached via attachment elements 92, such as bolts 92a, or another suitable attachment element.

FIG. 5F is an illustration of a cutaway top plan view of the wing 18, such as swing wing 18b, of FIG. 5A having wing tip 20, such as swing wing tip 20a. The wing 18 (see FIG. 5F) has a leading edge 22a (see FIG. 5F) and a trailing edge 22b (see FIG. 5F). As shown in FIG. 5F, the unfixed wing tip portion 76 is in an aft folded ground position 136, such as aft folded taxiing and runway ground position 136b. As further shown in FIG. 5F, the wing 18 has an embodiment of the swing wing tip system 80, such as swing wing tip system 80b, and an embodiment of the swing wing tip assembly 82, such as swing wing tip assembly 82b, according to the disclosure.

As shown in FIG. 5F, the swing wing tip assembly 82, such as swing wing tip assembly 82b, comprises the unfixed wing tip portion 76 movably connected to the fixed wing portion 78 via the rotation joint 84 (see FIG. 5A) and separated at hinge line 74 (see FIG. 5A). The unfixed wing tip portion 76 (see FIG. 5F) may include one or more wing tip members 71 (see FIG. 5F), such as one or more wing tip spars 71a (see FIG. 5F). The fixed wing portion 78 (see FIG. 5F) may comprise a wing box 66 (see FIG. 5F) extending from an inboard to outboard direction and having wing members 70 (see FIG. 5F), such as front wing spar 70a and rear wing spar 70b (see FIG. 5F), one or more wing ribs 68 (see FIG. 5F), such as one or more fixed wing ribs 68a (see FIG. 5F), slat 24 (see FIG. 5A), aileron 26 (see FIG. 5A), or other suitable structures.

In this exemplary embodiment of the swing wing tip assembly 82 shown in FIG. 5F, the rotation joint 84 (see FIG. 5A) comprises a dual rotation pin element 88, such as in the form of pivot pin 88b, having the center rotation axis 90. The rotation joint 84 (see FIG. 5A) further comprises dual rotation element 86 (see FIG. 5F), such as in the form of rotation fitting element 86c (see FIG. 5F). The rotation fitting element 86c (see FIG. 5F) is configured to rotate about the pivot pin 88b (see FIG. 5F) and the center rotation axis 90 (see FIG. 5F). Further, as shown in FIG. 5F, the rotation fitting element 86c rotates or pivots between and along tracks 116. The tip portion 87 (see FIG. 5E) of rotation fitting element 86c (see FIG. 5F) preferably rotates along a curved portion of track 116 (see FIG. 5F) adjacent wing rib 68 (see FIG. 5F).

In this exemplary embodiment of the swing wing tip system 80 shown in FIG. 5F, the actuator assembly 98 comprises a linear hydraulic actuator assembly 98b having an actuator element 100 and locking elements 118. The locking elements 118 may be in the form of a latch hydraulic pin locking element 118b (see FIG. 5F) to lock the rotation joint 84 (see FIG. 5A) in place, and in turn, the unfixed wing tip portion 76 (see FIG. 5F) in place, after the rotation joint 84 (see FIG. 5A) is actuated by the actuator element 100 (see FIG. 5F) to rotate. Alternatively, the actuator assembly 98 (see FIG. 5F), actuator element 100 (see FIG. 5F), and locking element 118 (see FIG. 5F) may comprise other suitable assemblies or elements.

FIG. 5F further shows a navigation element 102 enclosed within the wing 18. The navigation element 102 (see FIG. 5F) may be positioned near the hinge line 74 (see FIG. 5F) between the fixed wing portion 78 (see FIG. 5F) and the unfixed wing tip portion 76 (see FIG. 5F). The navigation element 102 (see FIG. 5F) may be exposed and activated in response to rotation of the unfixed wing tip portion 76 (see FIG. 5F).

In this exemplary embodiment of the swing wing tip system 80 shown in FIG. 5F, the wing 18 further comprises the moving panel 120 positioned near the trailing edge 22b of wing 18, such as near the unfixed wing tip portion 76. The moving panel 120 (see FIG. 5F) is preferably configured to move before the unfixed wing tip portion 76 (see FIG. 5F) is rotated. The moving panel 120 (see FIG. 5F) may comprise, for example but without limitation, a folding door 120a (see FIG. 5F) in a folded up configuration 140 (see FIG. 5F) or other suitable movable panel or surface configuration.

When the unfixed wing tip portion 76 (see FIG. 5F) is unfolded and not rotated, the moving panel 120 is preferably in the folded up configuration 140 (see FIG. 5F). The moving panel 120 (see FIG. 5F) may drop down or fold via the panel actuator mechanism 123 (see FIG. 5F), or another suitable actuator or sliding mechanism. As shown in FIG. 5F the moving panel 120, such as in the form of moving door 120a, is shown in a folded down position 142.

FIG. 6A is an illustration of a cutaway top plan view of a wing 18, such as swing wing 18c, having wing tip 20, such as in the form of swing wing tip 20c. More specifically, FIG. 6A is a top plan view, with wing skin cutaway, of selected interior components of swing wing tip system 80 depicted in accordance with an illustrative embodiment.

As shown in FIG. 6A, the wing 18 is in an unfolded flight position 132, such as an unfolded cruise position 132c. In the unfolded flight position 132, such as in the unfolded cruise position 132b, the wing 18 is preferably optimized for high speed performance. As further shown in FIG. 6A, the wing 18 has yet another embodiment of the swing wing tip system 80, such as swing wing tip system 80c, and yet another embodiment of the swing wing tip assembly 82, such as swing wing tip assembly 82c, according to the disclosure.

As shown in FIG. 6A, the swing wing tip assembly 82 comprises the unfixed wing tip portion 76 movably connected to the fixed wing portion 78 via the rotation joint 84, such as in the form of rotation joint 84c, and separated at hinge line 74. The unfixed wing tip portion 76 may be maintained in line with the fixed wing portion 78 in the unfolded flight position 132 and without rotation during the high speed flight condition.

The unfixed wing tip portion 76 (see FIG. 6A) may include one or more wing tip members 71 (see FIG. 6A), such as one or more wing tip spars 71a (see FIG. 6A). The fixed wing portion 78 (see FIG. 6A) may comprise a wing box 66 (see FIG. 6A) extending from an inboard to outboard direction and having front wing spar 70a and rear wing spar 70b (see FIG. 6A), slat 24 (see FIG. 6A), or other suitable structures.

In this exemplary embodiment of the swing wing tip assembly 82 shown in FIG. 6A, the rotation joint 84, such as in the form of rotation joint 84c, comprises a dual rotation pin element 88, in the form of plate pin 88c, having the center rotation axis 90. As further shown in FIG. 6A, the rotation joint 84 comprises dual rotation elements 86, such as in the form of rotation plate elements 86d. The rotation plate elements 86d (see FIG. 6A) are preferably configured to rotate about the plate pin 88c and the center rotation axis 90 (see FIG. 6A) and to rotate in line with pivot axis 130 (see FIG. 6A).

In this exemplary embodiment of the swing wing tip system 80 shown in FIG. 6A, the actuator assembly 98 comprises a linear hydraulic actuator assembly 98b having an actuator element 100 and locking element 118. The locking element 118 may be in the form of a latch hydraulic pin locking element 118b (see FIG. 6A) to lock the rotation joint 84 (see FIG. 6A) in place, and in turn, the unfixed wing tip portion 76 (see FIG. 6A) in place, after the rotation joint 84 (see FIG. 6A) is actuated by the actuator element 100 (see FIG. 6A) to rotate. Alternatively, the actuator assembly 98, actuator element 100 and locking element 118 may comprise other suitable assemblies or elements.

FIG. 6A further shows a navigation element 102 enclosed within the wing 18. The navigation element 102 (see FIG. 6A) may be positioned near the hinge line 74 (see FIG. 6A) between the fixed wing portion 78 (see FIG. 6A) and the unfixed wing tip portion 76 (see FIG. 6A). The navigation element 102 (see FIG. 6A) may be exposed and activated in response to rotation of the unfixed wing tip portion 76 (see FIG. 6A).

In this exemplary embodiment of the swing wing tip system 80 shown in FIG. 6A, the wing 18 further comprises a moving panel 120 positioned near the trailing edge 22b of wing 18, such as near the unfixed wing tip portion 76. The moving panel 120 (see FIG. 6A) is preferably configured to move before the unfixed wing tip portion 76 (see FIG. 6A) is rotated. The moving panel 120 (see FIG. 6A) may comprise, for example but without limitation, a folding door 120a (see FIG. 6A). As shown in FIG. 6A, the moving panel 120 is preferably designed to fold or rotate around a hinge line 122 and is designed to drop below the trailing edge 22b of the wing 18, such as near the unfixed wing tip portion 76, before the unfixed wing tip portion 76 is rotated.

Figure 6B:
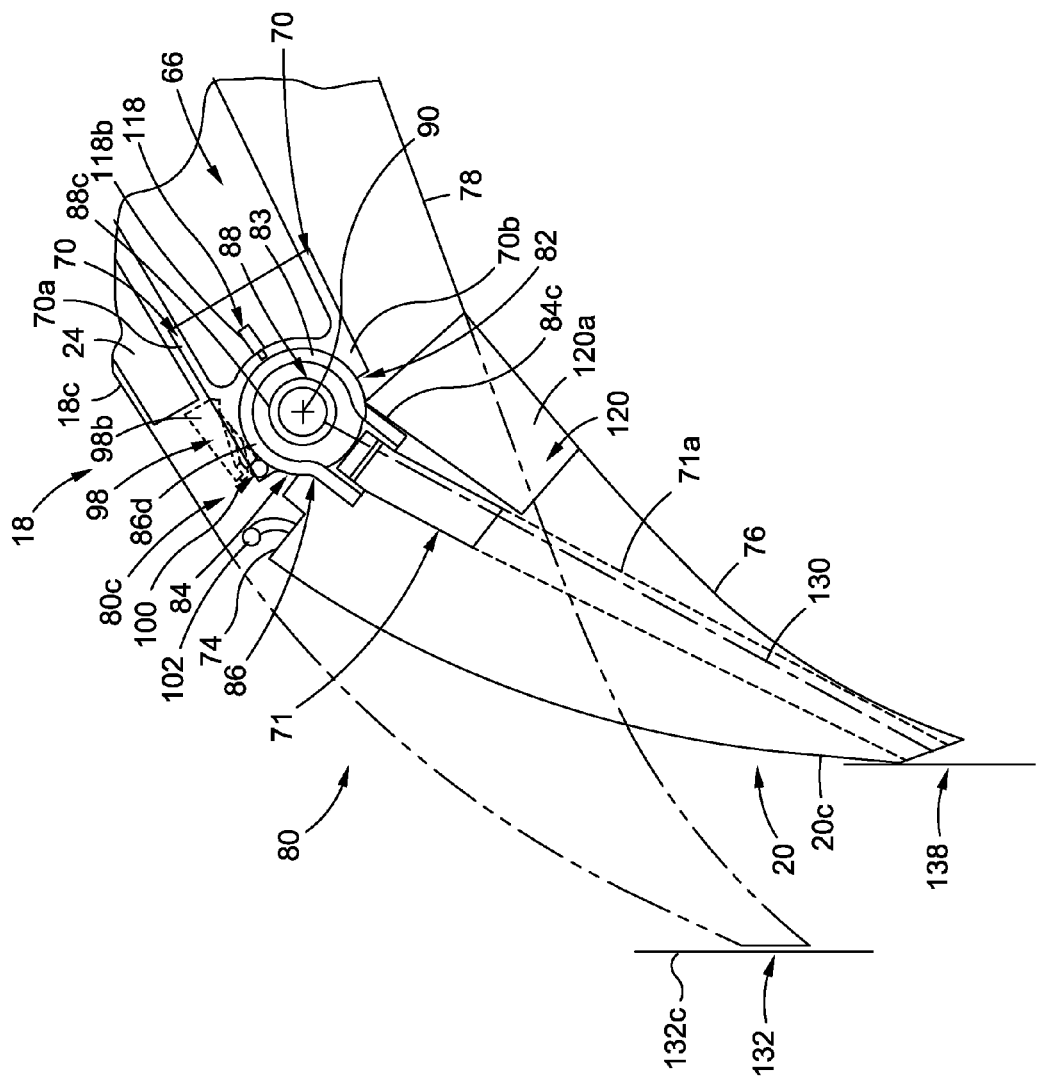
FIG. 6B is an illustration of a cutaway top plan view of the wing of FIG. 6A showing the wing in an aft folded transition position from an unfolded flight position.

FIG. 6B is an illustration of a cutaway top plan view of the wing 18, such as swing wing 18c, of FIG. 6A, having wing tip 20, such as in the form of swing wing tip 20c. As shown in FIG. 6B, the wing 18 is in an aft folded transition position 138 from an unfolded flight position 132, such as an unfolded cruise position 132c. In the unfolded flight position 132, such as in the unfolded cruise position 132c, the wing 18 is preferably optimized for high speed performance. As further shown in FIG. 6B, the wing 18 has yet another embodiment of the swing wing tip system 80, such as swing wing tip system 80c, and yet another embodiment of the swing wing tip assembly 82, such as swing wing tip assembly 82c, according to the disclosure.

As shown in FIG. 6B, the swing wing tip assembly 82 comprises the unfixed wing tip portion 76 movably connected to the fixed wing portion 78 via the rotation joint 84, such as in the form of rotation joint 84c, and separated at hinge line 74. The unfixed wing tip portion 76 (see FIG. 6B) may include one or more wing tip members 71 (see FIG. 6B), such as one or more wing tip spars 71a (see FIG. 6B). The fixed wing portion 78 (see FIG. 6B) may comprise a wing box 66 (see FIG. 6B) extending from an inboard to outboard direction and having wing members 70, such as front wing spar 70a and rear wing spar 70b (see FIG. 6A), slat 24 (see FIG. 6A), or other suitable structures.

In this exemplary embodiment of the swing wing tip system 80 shown in FIG. 6B, the rotation joint 84, such as in the form of rotation joint 84c, comprises a dual rotation pin element 88, in the form of plate pin 88c, having the center rotation axis 90. As further shown in FIG. 6B, the rotation joint 84 comprises dual rotation elements 86, such as in the form of rotation plate elements 86d. The rotation plate elements 86d (see FIG. 6B) are preferably configured to rotate about the plate pin 88c and the center rotation axis 90 (see FIG. 6B) and to rotate in line with pivot axis 130 (see FIG. 6B).

In this exemplary embodiment of the swing wing tip system 80 shown in FIG. 6B, the actuator assembly 98 comprises a linear hydraulic actuator assembly 98b having an actuator element 100 (see FIG. 6B) and locking element 118 (see FIG. 6B). The locking element 118 (see FIG. 6B) may be in the form of a latch hydraulic pin locking element 118b (see FIG. 6B) to lock the rotation joint 84 (see FIG. 6B) in place, and in turn, the unfixed wing tip portion 76 (see FIG. 6B) in place, after the rotation joint 84 (see FIG. 6A) is actuated by the actuator element 100 (see FIG. 6B) to rotate. Alternatively, the actuator assembly 98, actuator element 100 and locking element 118 may comprise other suitable assemblies or elements.

In this exemplary embodiment of the swing wing tip system 80 shown in FIG. 6B, the wing 18 further comprises a moving panel 120 positioned near the trailing edge 22b (see FIG. 6A) of wing 18, such as near the unfixed wing tip portion 76. The moving panel 120 (see FIG. 6B) is preferably configured to move before the unfixed wing tip portion 76 (see FIG. 6B) is rotated. The moving panel 120 (see FIG. 6B) may comprise, for example but without limitation, a folding door 120a (see FIG. 6B).

Figure 6C:
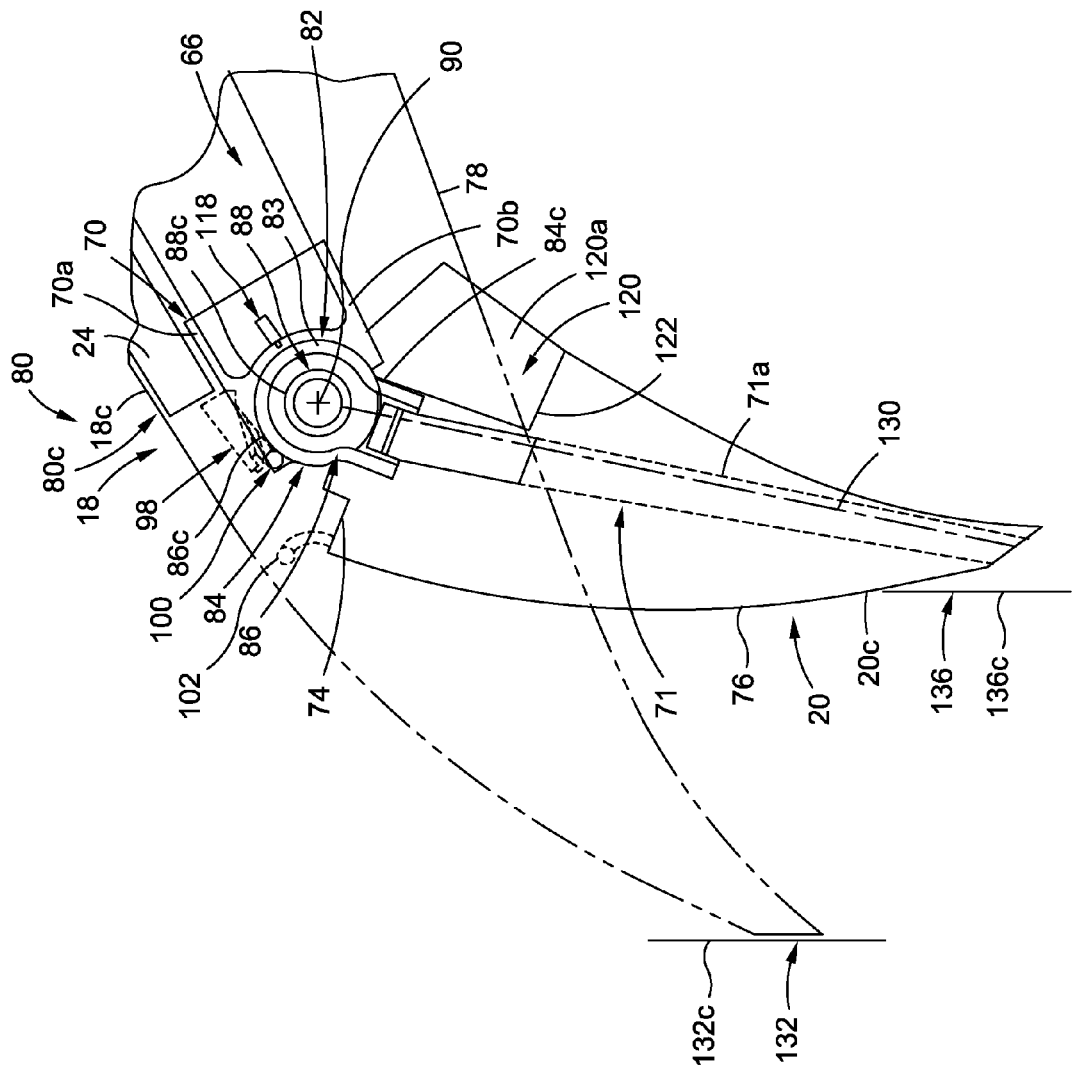
FIG. 6C is an illustration of a cutaway top plan view of the wing of FIG. 6A showing aft rotation of the wing from an unfolded flight position to an aft folded ground position.

FIG. 6C is an illustration of a cutaway top plan view of the wing 18, such as swing wing 18c, of FIG. 6A, showing aft rotation of the wing 18 from an unfolded flight position 132, such as unfolded cruise condition 132c, to an aft folded ground position 136, such as aft folded taxiing and runway ground position 136c. As further shown in FIG. 6C, the wing 18 has yet another embodiment of the swing wing tip system 80, such as swing wing tip system 80c, and yet another embodiment of the swing wing tip assembly 82, such as swing wing tip assembly 82c, according to the disclosure.

As shown in FIG. 6C, the swing wing tip assembly 82 comprises the unfixed wing tip portion 76 movably connected to the fixed wing portion 78 via the rotation joint 84, such as in the form of rotation joint 84c, and separated at hinge line 74. The unfixed wing tip portion 76 (see FIG. 6C) may include one or more wing tip members 71 (see FIG. 6C), such as one or more wing tip spars 71a (see FIG. 6C). The fixed wing portion 78 (see FIG. 6C) may comprise a wing box 66 (see FIG. 6C) extending from an inboard to outboard direction and having wing members 70, such as front wing spar 70a and rear wing spar 70b (see FIG. 6A), slat 24 (see FIG. 6C), or other suitable structures.

In this exemplary embodiment of the swing wing tip assembly 82 shown in FIG. 6C, the rotation joint 84, such as in the form of rotation joint 84c, comprises a dual rotation pin element 88, in the form of plate pin 88c, having the center rotation axis 90. As further shown in FIG. 6C, the rotation joint 84 comprises dual rotation elements 86, such as in the form of rotation plate elements 86d. The rotation plate elements 86d (see FIG. 6C) are preferably configured to rotate about the plate pin 88c and the center rotation axis 90 (see FIG. 6C) and to rotate in line with pivot axis 130 (see FIG. 6C).

In this exemplary embodiment of the swing wing tip system 80 shown in FIG. 6C, the actuator assembly 98 comprises a linear hydraulic actuator assembly 98b (see FIG. 6B) having an actuator element 100 and locking element 118. The locking element 118 may be in the form of a latch hydraulic pin locking element 118b (see FIG. 6A) to lock the rotation joint 84 (see FIG. 6C) in place, and in turn, the unfixed wing tip portion 76 (see FIG. 6C) in place, after the rotation joint 84 (see FIG. 6C) is actuated by the actuator element 100 (see FIG. 6C) to rotate. Alternatively, the actuator assembly 98, actuator element 100 and locking element 118 may comprise other suitable assemblies or elements.

FIG. 6C further shows a navigation element 102 enclosed within the wing 18. The navigation element 102 (see FIG. 6C) may be positioned near the hinge line 74 (see FIG. 6C) between the fixed wing portion 78 (see FIG. 6C) and the unfixed wing tip portion 76 (see FIG. 6A). The navigation element 102 (see FIG. 6C) may be exposed and activated in response to rotation of the unfixed wing tip portion 76 (see FIG. 6C).

In this exemplary embodiment of the swing wing tip system 80 shown in FIG. 6C, the wing 18 further comprises a moving panel 120 positioned near the trailing edge 22b of wing 18, such as near the unfixed wing tip portion 76. The moving panel 120 (see FIG. 6C) is preferably configured to move before the unfixed wing tip portion 76 (see FIG. 6C) is rotated. The moving panel 120 (see FIG. 6C) may comprise, for example but without limitation, a folding door 120a (see FIG. 6C). As shown in FIG. 6C, the moving panel 120 is preferably designed to fold or rotate around a hinge line 122 and is designed to drop below the trailing edge 22b of the wing 18, such as near the unfixed wing tip portion 76, before the unfixed wing tip portion 76 is rotated.

Figure 7A:
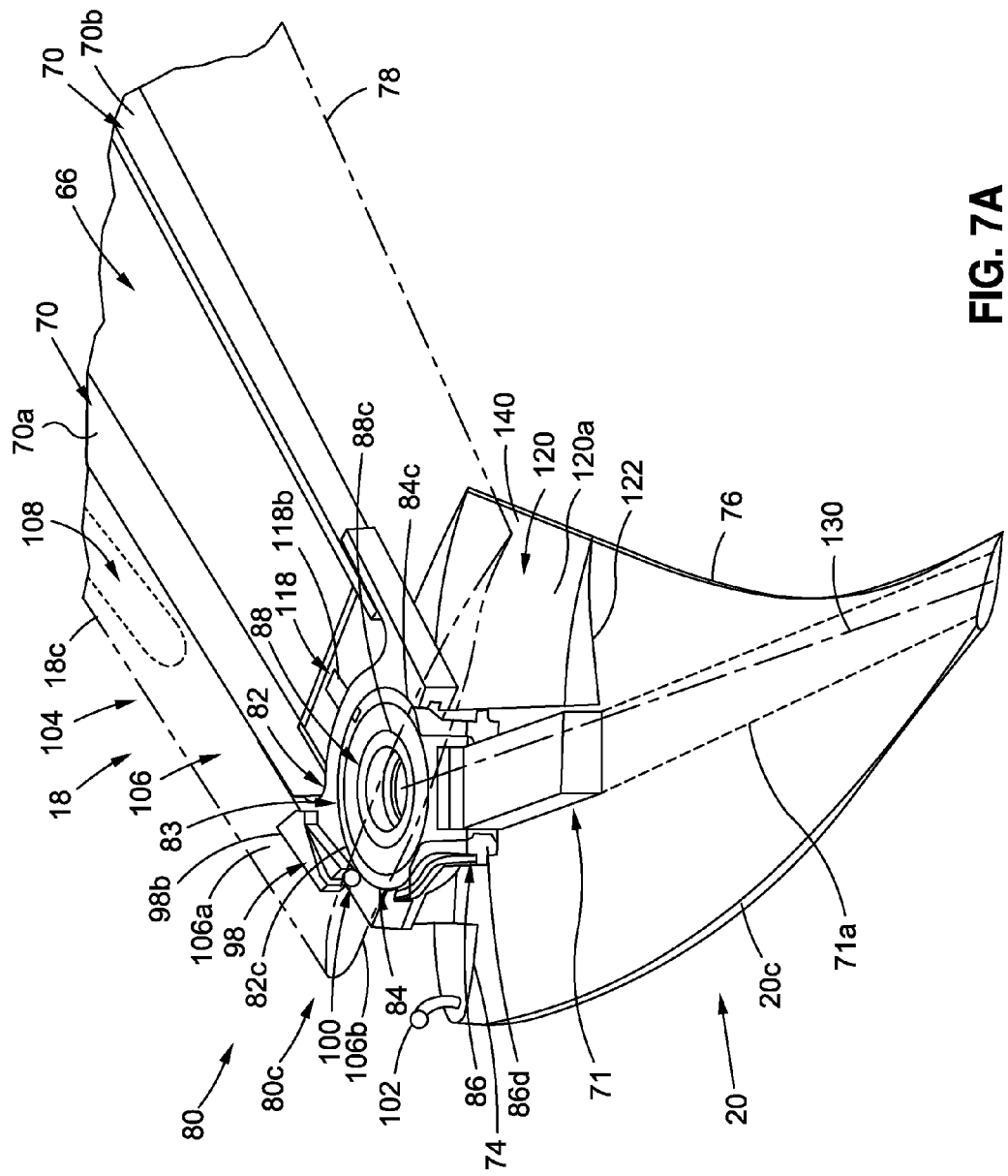
FIG. 7A is an illustration of a cutaway top perspective view of the wing of FIG. 6A showing the wing folded aft.

FIG. 7A is an illustration of a cutaway top perspective view of the wing 18, such as swing wing 18c, showing the wing 18 folded aft and showing the dual load path structure 83. As shown in FIG. 7A, the wing 18 has swing wing tip system 80, such as swing wing tip system 80c, and has swing wing tip assembly 82, such as swing wing tip assembly 82c.

As shown in FIG. 7A, the swing wing tip assembly 82 comprises the unfixed wing tip portion 76 movably connected to the fixed wing portion 78 via the rotation joint 84, such as in the form of rotation joint 84c, and separated at hinge line 74. FIG. 7A further shows wing box 66, wing members 70, such as front wing spar 70a and rear wing spar 70b, wing tip member 71, such as wing tip spar 71a, the navigation element 102 positioned at the hinge line 74, and moving panel 120, such as folding door 120a, at hinge line 122.

FIG. 7A further shows the dual load path structure 83 comprising the dual wing skin plates 104 with the wing skins 106, such as upper wing skin 106a and lower wing skin 106b, and each wing skin 106 having plate portion 108. As further shown in FIG. 7A, the dual load path structure 83 comprises rotation joint 84, such as in the form of rotation joint 84c, comprising the dual rotation pin element 88, such as in the form of plate pin 88c, and the dual rotation elements 86, such as in the form of rotation plate elements 86d. The rotation plate elements 86d (see FIG. 7A) are preferably configured to rotate about the plate pin 88c (see FIG. 7A) and to rotate in line with pivot axis 130 (see FIG. 7A).

In this exemplary embodiment of the swing wing tip system 80 shown in FIG. 7A, the actuator assembly 98 may comprise a linear hydraulic actuator assembly 98b having an actuator element 100 and locking element 118, such as in the form of locking element 118b. The locking element 118 (see FIG. 7A) may be in the form of a latch hydraulic pin locking element 118b (see FIG. 7A). Alternatively, the actuator assembly 98, actuator element 100 and locking element 118 may comprise other suitable assemblies or elements.

Figure 7B:
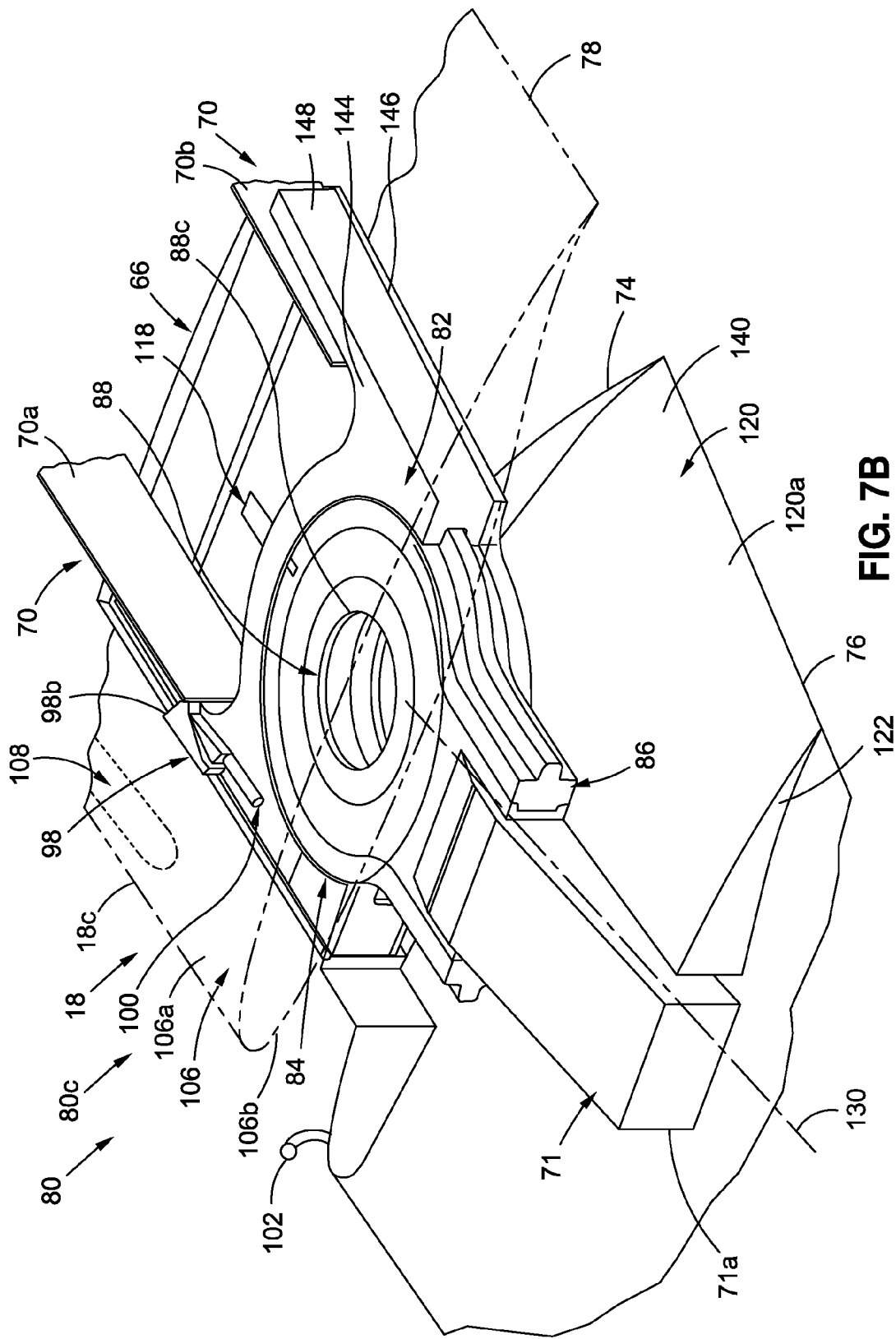
FIG. 7B is an illustration of a close-up cutaway top perspective view of an embodiment of the rotation joint of FIG. 7A.

FIG. 7B is an illustration of a close-up cutaway top perspective view of an embodiment of the rotation joint 84 of FIG. 7A coupled to a slide plate assembly 144. As shown in FIG. 7B, the rotation joint 84 comprises the dual rotation pin element 88, such as in the form of plate pin 88c, and the dual rotation elements 86, such as in the form of rotation plate elements 86d (see FIG. 7A). As further shown in FIG. 7B, the dual rotation elements 86, which are moving parts, are coupled to the slide plate assembly 144, which are fixed parts. As further shown in FIG. 7B, the slide plate assembly 144 comprises a first plate portion 146 attached to a second plate portion 148. The dual rotation elements 86 (see FIG. 7B) are preferably configured to rotate about the plate pin 88c (see FIG. 7B) within the slide plate assembly 144 and in line with pivot axis 130 (see FIG. 7B).

FIG. 7B further shows the wing 18, such as in the form of swing wing 18c, with the swing wing tip system 80, such as swing wing tip system 80c, and with the swing wing tip assembly 82, such as swing wing tip assembly 82c. FIG. 7B further shows the unfixed wing tip portion 76 and the fixed wing portion 78 separated by hinge line 74, and shows wing box 66, wing members 70, such as front wing spar 70a and rear wing spar 70b, wing tip member 71, such as wing tip spar 71a, the navigation element 102 positioned at the hinge line 74, the wing skins 106, such as upper wing skin 106a and lower wing skin 106b, the plate portion 108, and moving panel 120, such as folding door 120a, at hinge line 122, in the folded up position 140. FIG. 7B further shows the actuator assembly 98, such as in the form of linear hydraulic actuator assembly 98b, having actuator element 100 and locking element 118.

Figure 7C:
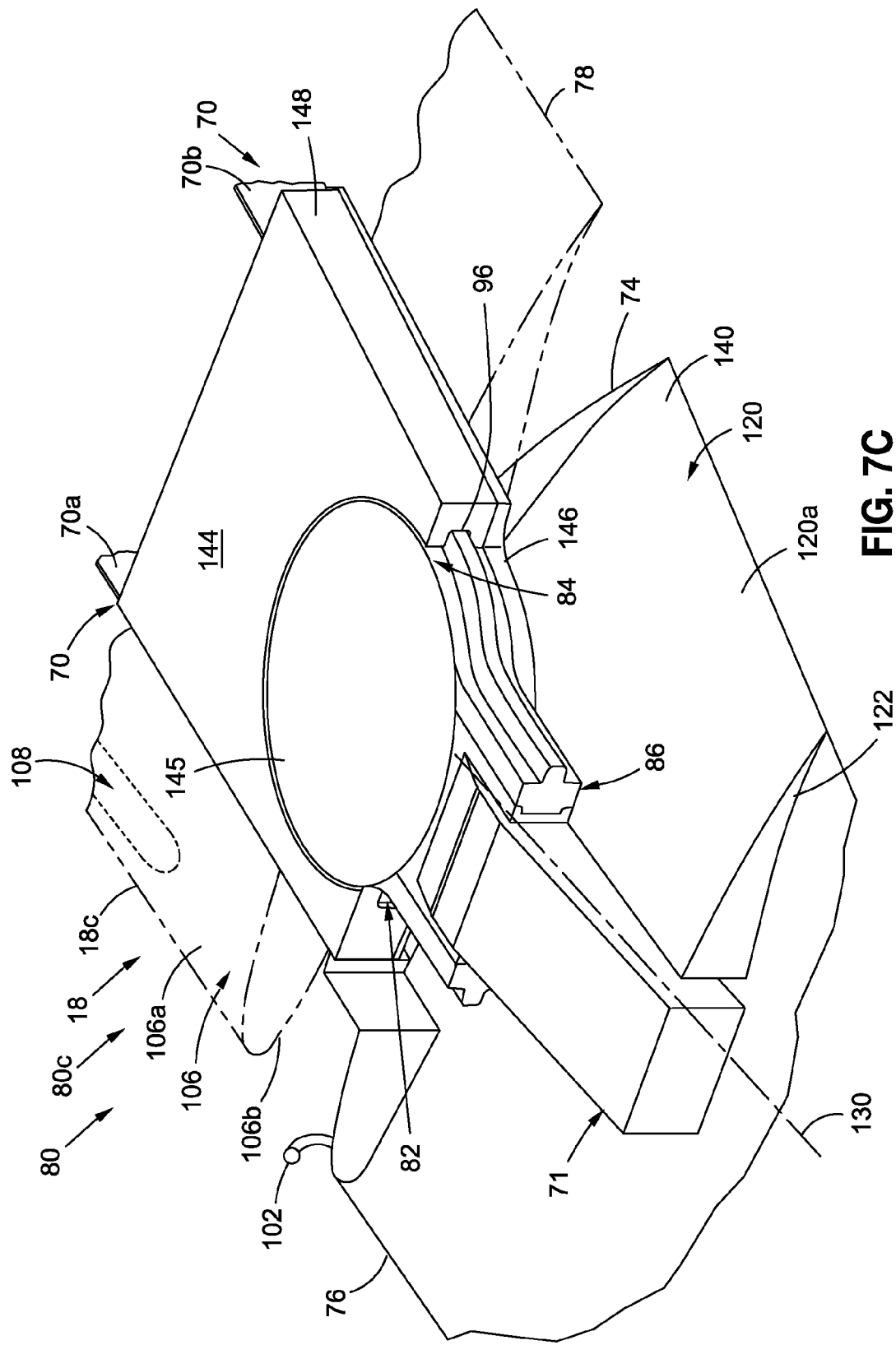
FIG. 7C is an illustration of a close-up top perspective view of the rotation joint of FIG. 7B showing a top plate over the rotation joint; and, FIG. 8 is an illustration of a flow diagram of an exemplary embodiment of a method of the disclosure.

FIG. 7C is an illustration of a close-up top perspective view of the rotation joint 84 of FIG. 7B showing a cover plate 145 coupled to the slide plate assembly 144. The cover plate 145 is preferably coupled to and fitted within the top of the second plate portion 148 of the slide plate assembly 144 and is shown positioned over the dual rotation pin element 88 (see FIG. 7B), such as in the form of plate pin 88c (see FIG. 7B). As shown in FIG. 7C, when the dual rotation elements 86 are coupled to the second plate portion 148 of the slide plate assembly 144, the tongue and groove configuration 96 is formed. The dual rotation elements 86 (see FIG. 7C) are preferably configured to rotate within the slide plate assembly 144 (see FIG. 7C) and in line with pivot axis 130 (see FIG. 7C).

FIG. 7C further shows the wing 18, such as in the form of swing wing 18c, with the swing wing tip system 80, such as swing wing tip system 80c, the unfixed wing tip portion 76 and the fixed wing portion 78 separated by hinge line 74, wing members 70, such as front wing spar 70a and rear wing spar 70b, wing tip member 71, navigation element 102, wing skins 106, such as upper wing skin 106a and lower wing skin 106b, plate portion 108, and moving panel 120, such as folding door 120a, at hinge line 122, in the folded up position 140.

In another embodiment of the disclosure, there is provided an aircraft 11 (see FIGS. 1, 3A) having fail-safe load paths 160 (see FIG. 3A) for one or more wings 18 (see FIGS. 1, 3A), such as in the form of swing wings 18a. As shown in FIG. 1, the aircraft 11 comprises at least one fuselage 12 and one or more wings 18 each having a wing tip 20 with a swing wing tip system 80. The aircraft 11 (see FIGS. 1, 3A) preferably has a wingspan 21 (see FIGS. 1, 3A) configured to be reduced or decreased in length to provide a reduced wingspan 21a (see FIG. 3A) to allow ground operation of the aircraft 11 (see FIGS. 1, 3A) at an airport that prohibits ground operation of aircraft with an expanded wingspan.

The swing wing tip system 80 (see FIGS. 3A, 4A, 5A, 6A) of the aircraft 11 (see FIG. 1) preferably comprises the swing wing tip assembly 82 (see FIGS. 3A, 4A, 5A, 6A), as discussed in detail above. The swing wing tip assembly (see FIGS. 3A, 4A, 5A, 6A) comprises the unfixed wing tip portion 76 (see FIGS. 3A, 4A, 5A, 6A) movably connected to the fixed wing portion 78 (see FIGS. 3A, 4A, 5A, 6A) of the one or more wings 18 (see FIGS. 3A, 4A, 5A, 6A) of the aircraft 11 (see FIGS. 1, 3A).

The swing wing tip assembly 82 (see FIGS. 3A, 4A, 5A, 6A) of the aircraft 11 (see FIG. 1) further comprises the dual load path structure 83 (see FIGS. 3A, 4B, 5B, 6A) providing fail-safe load paths 160 (see FIG. 3A) for the one or more wings 18 (see FIGS. 1, 3A). The dual load path structure 83 (see FIGS. 3A, 4B, 5B, 6A) is preferably configured to transfer load from the unfixed wing tip portion 76 (see FIGS. 3A, 4A, 5A, 6A) to the fixed wing portion 78 (see FIGS. 3A, 4A, 5A, 6A).

As discussed above, the dual load path structure 83 (see FIGS. 3A, 4B, 5B, 6A) comprises dual wing skin plates 104 (see FIGS. 3A, 4B, 5B, 7A) comprising wing skins 106 (see FIGS. 3A, 4B, 5B, 7A), such as upper wing skin 106a (see FIGS. 3A, 4B, 5B, 7A) and lower wing skin 106b (see FIGS. 3A, 4B, 5B, 7A). Each wing skin 106 (see FIGS. 3A, 4B, 5B) has a plate portion 108 (see FIGS. 3A, 4B, 5B) attached to the wing skin 106 (see FIGS. 3A, 4B, 5B). The plate portion 108 (see FIGS. 3A, 4B, 5B) is preferably a titanium plate portion 108a (see FIGS. 3A, 4B, 5B). However, another suitably strong metal or hard material may be used for the plate portion.

The dual load path structure 83 (see FIGS. 3A, 4B, 5B, 6A) of the aircraft 11 (see FIG. 1) preferably further comprises the rotation joint 84 (see FIGS. 3A, 4A, 5A, 6A) coupled between the dual wing skin plates 104 (see FIGS. 3A, 4B, 5B, 7A). The rotation joint 84 (see FIGS. 3A, 4A, 5A, 6A) is preferably configured to rotationally couple the unfixed wing tip portion 76 (see FIGS. 3A, 4A, 5A, 6A) to the fixed wing portion 78 (see FIGS. 3A, 4A, 5A, 6A). The rotation joint 84 (see FIGS. 3A, 4A, 5A, 6A) preferably comprises the dual rotation pin element 88 (see FIGS. 3A, 4A, 5A, 6A) having a center rotation axis 90 (see FIGS. 3A, 4B, 5B, 6A) and dual rotation elements 86 (see FIGS. 3A, 4A, 5A, 6A) configured to rotate about the center rotation axis 90 (see FIGS. 3A, 4B, 5B, 6A).

The dual load path structure 83 (see FIGS. 3A, 4B, 5B, 6A) may further comprise dual channel segments 94 (see FIGS. 4B-4C) coupled between the dual wing skin plates 104 (see FIGS. 4B-4C).

The one or more wings 18 (see FIGS. 1, 3A) of the aircraft 11 (see FIG. 1) further comprises an actuator assembly 98 (see FIGS. 3A, 4A, 5A, 6A) operatively coupled to the rotation joint 84 (see FIGS. 3A, 4A, 5A, 6A) to actuate the rotation joint (see FIGS. 3A, 4A, 5A, 6A), enabling rotation of the unfixed wing tip portion 76 (see FIGS. 3A, 4A, 5A, 6A) with respect to the fixed wing portion 78 (see FIGS. 3A, 4A, 5A, 6A) about the center rotation axis 90 (see FIGS. 3A, 4B, 5B, 6A) and in line with pivot axis 130 (see FIGS. 6C, 7A) at the selected operation condition 131 (see FIG. 3A). The selected operation condition 131 (see FIG. 3A) may provide a position of the unfixed wing tip portion 76 (see FIGS. 3A, 4A, 5A, 6A) comprising one of an unfolded flight position 132 (see FIGS. 4A, 5A, 6A), an aft folded ground position 136 (see FIGS. 4E, 5F, 6C), a forward folded flight position 134 (see FIG. 4D), or another suitable selected operation condition.

The one or more wings 18 (see FIGS. 1, 3A) of the aircraft 11 (see FIG. 1) further comprises a controller system 150 (see FIG. 3A) operatively coupled to the actuator assembly 98 (see FIGS. 3A, 4A, 5A, 6A) to control actuation of the rotation joint 84 (see FIGS. 3A, 4A, 5A, 6A) and rotation of the unfixed wing tip portion 76 (see FIGS. 3A, 4A, 5A, 6A). The one or more wings 18 (see FIGS. 1, 3A) further comprises a navigation element 102 (see FIGS. 4A, 5A, 6A) positioned near a hinge line 74 (see FIGS. 4A, 5A, 6A) between the fixed wing portion 78 (see FIGS. 3A, 4A, 5A, 6A) and the unfixed wing tip portion 76 (see FIGS. 3A, 4A, 5A, 6A) and operable to be exposed and activated in response to rotation of the unfixed wing tip portion 76 (see FIGS. 3A, 4A, 5A, 6A).

The swing wing tip assembly 82 (see FIGS. 3A, 4A, 5A, 6A) of the aircraft 11 (see FIG. 1) further comprises a moving panel 120 (see FIGS. 5A, 6A) positioned near a trailing edge 22b (see FIGS. 5A, 6A) of the unfixed wing tip portion 76 (see FIGS. 5A, 6A) and configured to move before the unfixed wing tip portion 76 (see FIGS. 5A, 6A) is rotated.

Figure 8:
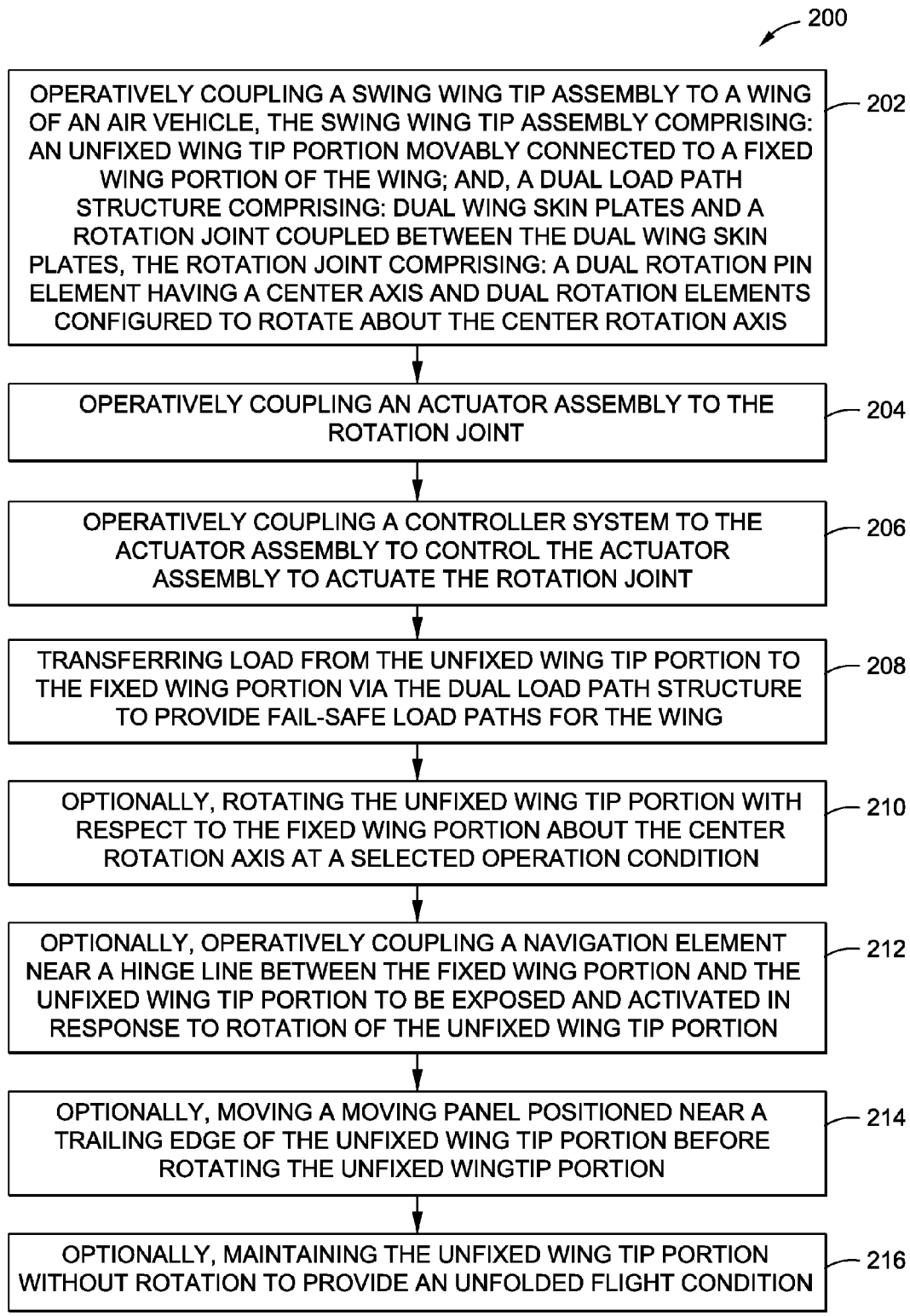

In another embodiment of the disclosure, there is provided a method 200 (see FIG. 8) for providing fail-safe load paths 160 (see FIG. 3A) for a wing 18 (see FIGS. 1, 3A) of an air vehicle 10 (see FIGS. 1, 3A), such as an aircraft 11 (see FIGS. 1, 3A). FIG. 8 is an illustration of a flow diagram of an exemplary embodiment of the method 200 of the disclosure.

The method 200 may include steps listed below. The steps listed for method 200 may be performed in an order other than that presented. Some steps may be performed simultaneously. Some steps may be optional or omitted. Steps other than those listed may be added. Performance of some steps, or ordering of steps, may be dependent upon a beginning position of the wing, such as a flight position or a folded position, or being in transition between positions.

As shown in FIG. 8, the method 200 comprises step 202 of operatively coupling a swing wing tip assembly 82 (see FIGS. 3A, 4A, 5A, 6A) to the wing 18 (see FIGS. 1, 3A, 4A, 5A, 6A), such as in the form of swing wing 18a, 18b, 18c (see FIG. 3A), of the air vehicle 10 (see FIGS. 1, 3A). As discussed in detail above, the swing wing tip assembly 82 (see FIGS. 3A, 4A, 5A, 6A) comprises the unfixed wing tip portion 76 (see FIGS. 3A, 4A, 5A, 6A) movably connected to the fixed wing portion 78 (see FIGS. 3A, 4A, 5A, 6A) of the wing 18 (see FIGS. 3A, 4A, 5A, 6A).

As discussed in detail above, the swing wing tip assembly 82 (see FIGS. 3A, 4A, 5A, 6A) further comprises the dual load path structure 83 (see FIGS. 3A, 4B, 5B, 6A). The dual load path structure 83 (see FIGS. 3A, 4B, 5B, 6A) preferably comprises dual wing skin plates 104 (see FIGS. 3A, 4B, 5B, 7A) and the rotation joint 84 (see FIGS. 3A, 4A, 5A, 6A) coupled between the dual wing skin plates 104 (see FIGS. 3A, 4B, 5B, 7A). The rotation joint 84 (see FIGS. 3A, 4A, 5A, 6A) preferably comprises the dual rotation pin element 88 (see FIGS. 3A, 4A, 5A, 6A) having a center rotation axis 90 (see FIGS. 3A, 4B, 5B, 6A) and dual rotation elements 86 (see FIGS. 3A, 4A, 5A, 6A) configured to rotate about the center rotation axis 90 (see FIGS. 3A, 4B, 5B, 6A).

As shown in FIG. 8, the method 200 further comprises step 204 of operatively coupling an actuator assembly 98 (see FIGS. 3A, 4A, 5A, 6A) to the rotation joint 84 (see FIGS. 3A, 4A, 5A, 6A). As shown in FIG. 8, the method 200 further comprises step 206 of operatively coupling a controller system 150 (see FIG. 3A) to the actuator assembly 98 (see FIGS. 3A, 4A, 5A, 6A) to control the actuator assembly 98 (see FIGS. 3A, 4A, 5A, 6A) to actuate the rotation joint 84 (see FIGS. 3A, 4A, 5A, 6A).

As shown in FIG. 8, the method 200 further comprises step 208 of transferring load from the unfixed wing tip portion 76 (see FIGS. 3A, 4A, 5A, 6A) to the fixed wing portion 78 (see FIGS. 3A, 4A, 5A, 6A) via the dual load path structure 83 (see FIGS. 3A, 4B, 5B, 6A). This provides fail-safe load paths 160 (see FIG. 3A) for the wing 18 (see FIGS. 1, 3A, 4A, 5A, 6A) of the air vehicle 10 (see FIGS. 1, 3A).

As shown in FIG. 8, the method 200 further comprises optional step 210 of rotating the unfixed wing tip portion 76 (see FIGS. 3A, 4A, 5A, 6A) with respect to the fixed wing portion 78 (see FIGS. 3A, 4A, 5A, 6A) about the center rotation axis 90 (see FIGS. 3A, 4B, 5B, 6A) at a selected operation condition 131 (see FIG. 3A). The step 210 of rotating the unfixed wing tip portion 76 (see FIGS. 3A, 4A, 5A, 6A) with respect to the fixed wing portion 78 (see FIGS. 3A, 4A, 5A, 6A) at the selected operation condition 131 (see FIG. 3A) may further comprise rotating the unfixed wing tip portion 76 (see FIGS. 3A, 4A, 5A, 6A) to provide an aft folded ground position 136 (see FIGS. 4E, 5F, 6C). Further, the step 210 of rotating the unfixed wing tip portion 76 (see FIGS. 3A, 4A, 5A, 6A) with respect to the fixed wing portion 78 (see FIGS. 3A, 4A, 5A, 6A) at the selected operation condition 131 (see FIG. 3A) may further comprise rotating the unfixed wing tip portion 76 (see FIGS. 3A, 4A, 5A, 6A) to provide a forward folded flight position 134 (see FIG. 4D).

As shown in FIG. 8, the method 200 further comprises optional step 212 of operatively coupling a navigation element 102 (see FIGS. 4A, 5A, 6A) near the hinge line 74 (see FIGS. 4A, 5A, 6A) between the fixed wing portion 78 (see FIGS. 4A, 5A, 6A) and the unfixed wing tip portion 76 (see FIGS. 4A, 5A, 6A). The navigation element 102 (see FIGS. 4A, 5A, 6A) may be exposed and activated in response to rotation of the unfixed wing tip portion 76 (see FIGS. 4A, 5A, 6A).

As shown in FIG. 8, the method 200 further comprises optional step 214 of moving a moving panel 120 (see FIGS. 5A, 6A) positioned near the trailing edge 22b (see FIGS. 5A, 6A) of the unfixed wing tip portion 76 (see FIGS. 5A, 6A) before rotating the unfixed wing tip portion 76 (see FIGS. 5A, 6A). As shown in FIG. 8, the method 200 further comprises optional step 216 of maintaining the unfixed wing tip portion (see FIGS. 4A, 5A, 6A) without rotation to provide an unfolded flight condition 132 (see FIGS. 4A, 5A, 6A).

As will be appreciated by those of skill in the art, incorporating the swing wing tip system 80 (see FIGS. 3A, 4A, 5A, 6A) and the swing wing tip assembly 82 (see FIGS. 3A, 4A, 5A, 6A) into the wing 18 (see FIG. 1) of an air vehicle 10 (see FIG. 1), such as an aircraft 11 (see FIG. 1), results in a number of substantial benefits. Disclosed embodiments of the swing wing tip system 80 (see FIGS. 3A, 4A, 5A, 6A), the swing wing tip assembly 82 (see FIGS. 3A, 4A, 5A, 6A), and method 200 (see FIG. 8) provide a design that allows the unfixed wing tip portion 76 (see FIGS. 3A, 4A) to rotate aft in an aft folded ground position 136 (see FIGS. 4E, 5F, 6C) in order to facilitate a reduced wing span 21*a* (see FIG. 3A) during ground movement of the air vehicle 10 (see FIG. 1), such as at airport runways and taxiways and during airport gate parking. In addition, the design allows the unfixed wing tip portion 76 (see FIGS. 3A, 4A) to rotate forward from the aft folded ground position 136 to the unfolded flight position 132 (see FIGS. 4A, 5A, 6A) for high speed aerodynamic benefit. Further, in one embodiment, the design allows the unfixed wing tip portion 76 (see FIGS. 3A, 4A) to rotate forward from the unfolded flight position 132 (see FIGS. 4A, 5A, 6A) to a forward folded flight position 134 (see FIG. 4D) for low speed take-off and climb conditions.

Thus, disclosed embodiments of the swing wing tip system 80 (see FIGS. 3A, 4A, 5A, 6A), the swing wing tip assembly 82 (see FIGS. 3A, 4A, 5A, 6A), and method 200 (see FIG. 8) provide a wing 18 (see FIG. 1) that is optimized for both low speed and high speed positions. In addition, they provide a wing 18 (see FIG. 1), such as in the form of swing wing 18*a*, having a wing tip 20, such as in the form of swing wing tip 20*a* (see FIG. 3A), with the capability to change the wingspan 21 (see FIG. 1) of the air vehicle 10, while allowing the air vehicle 10 (see FIG. 1) to be more efficient in flight with a wingspan 21 (see FIG. 1) that is longer or increased in length, yet still being able to stay within existing airport restrictions, i.e., 213 foot wingspan or less. For example, one embodiment of the swing wing tip system 80 (see FIG. 3A) and swing wing tip assembly 82 (see FIG. 3A) may provide a wingspan 21 (see FIG. 1) that is lengthened or increased by an additional 8 (eight) feet or more to enhance take-off and climb performance when the unfixed wing tip portion 76 (see FIG. 3A) of the wing 18 (see FIG. 1) is rotated or folded forward at the take-off position, e.g., rotated about 30 (thirty) degrees forward.

Moreover, disclosed embodiments of the swing wing tip system 80 (see FIGS. 3A, 4A, 5A, 6A), the swing wing tip assembly 82 (see FIGS. 3A, 4A, 5A, 6A), and method 200 (see FIG. 8) provide a wing 18 (see FIG. 1), such as in the form of swing wing 18*a*, 18*b*, 18*c* (see FIG. 3A), having a dual load path structure 83 (see FIG. 3A) with dual wing skin plates 104 (see FIG. 3A), dual rotation elements 86 (see FIG. 3A), a dual rotation pin element 88 (see FIG. 3A), and other suitable redundant structures. The dual load path structure 83 (see FIG. 3A) provides fail-safe load paths 160 (see FIG. 3A) for primary load carrying members, such as the wing 18 (see FIG. 1) of the air vehicle 10 (see FIG. 1). The dual load path structure 83 (see FIGS. 3A, 4B, 5B, 6A) provides two separate load bearing paths to carry a load in a fail-safe manner, one path carrying the load upon failure of the other, and thus may provide improved safety of the air vehicle 10 (see FIG. 1).

In addition, positioning the dual rotation pin element 88 (see FIG. 4B) between the dual wing skin plates 104 (see FIG. 4B), i.e., dual devises, may provide replaceability of the unfixed wing tip portion 76 (see FIG. 4B) in a manner similar to replaceability of known winglets while still providing substantial torsional stiffness of the rotation joint 84 (see FIG. 4B). Thus, a minimum maintenance may be performed, as compared to winglet or wing configurations that allow no access or no maintenance.

In addition, disclosed embodiments of the swing wing tip system 80 (see FIGS. 3A, 4A, 5A, 6A), the swing wing tip assembly 82 (see FIGS. 3A, 4A, 5A, 6A), and method 200 (see FIG. 8) provide a wing 18 (see FIG. 1) having shear load paths 72 that are improved and having the capability to direct about a 200 (two hundred) degree shear load transfer from the unfixed wing tip portion 76 (see FIG. 4B) to the fixed wing portion 78 (see FIG. 4B) at the rotation joint 84 (see FIG. 4B).

Moreover, disclosed embodiments of the swing wing tip system 80 (see FIGS. 3A, 4A, 5A, 6A), the swing wing tip assembly 82 (see FIGS. 3A, 4A, 5A, 6A), and method 200 (see FIG. 8) provide a wing 18 (see FIG. 1) having a moving panel 120 (see FIG. 3A) that may be rotated and tucked within the wing 18 during rotation of the unfixed wing tip portion 76 (see FIG. 3A). The moving panel design thus eliminates the use of known slaved doors or folding panels on the wing. This, in turn, may improve operation of the swing wing tip system 80 (see FIGS. 3A, 4A, 5A, 6A), the swing wing tip assembly 82 (see FIGS. 3A, 4A, 5A, 6A) during flight.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A swing wing tip system for an air vehicle, the system comprising:
   a swing wing tip assembly comprising:
   an unfixed wing tip portion movably connected to a fixed wing portion of a wing of an air vehicle;
   a dual load path structure providing two separate load bearing paths comprising dual wing skins and a rotation joint to carry load in a fail-safe manner, and the dual load path structure configured to transfer load from the unfixed wing tip portion to the fixed wing portion, the dual load path structure comprising:
   dual wing skin plates comprising an upper wing skin with a separate plate portion attached to the upper wing skin and comprising a lower wing skin with another separate plate portion attached to the lower wing skin, the separate plate portions being flush with the respective upper wing skin and the lower wing skin; and
   the rotation joint coupled between the dual wing skins and configured to rotationally couple the unfixed wing tip portion to the fixed wing portion, the dual wing skins positioned across both sides of the rotation joint, the rotation joint comprising:
   a dual rotation pin element having a center rotation axis; and,
   dual rotation elements configured to rotate about the center rotation axis;
   an actuator assembly operatively coupled to the rotation joint to actuate the rotation joint enabling rotation of the unfixed wing tip portion with respect to the fixed wing portion about the center rotation axis at a selected operation condition; and,
   a controller system operatively coupled to the actuator assembly to control actuation of the rotation joint and rotation of the unfixed wing tip portion.

2. The system of claim 1 further comprising a navigation element positioned near a hinge line between the fixed wing portion and the unfixed wing tip portion and operable to be exposed and activated in response to rotation of the unfixed wing tip portion.

3. The system of claim 1 wherein the swing wing tip assembly further comprises a moving panel positioned near a trailing edge of the unfixed wing tip portion and configured to move before the unfixed wing tip portion is rotated.

4. The system of claim 1 wherein the dual load path structure further comprises dual channel segments coupled between the dual wing skins.

5. The system of claim 1 wherein each plate portion comprises a titanium plate portion.

6. The system of claim 1 wherein the dual rotation pin element comprises one of: a disc pin, a pivot pin, and a plate pin.

7. The system of claim 1 wherein the dual rotation elements comprise one of: lug elements, rotation fitting elements, and rotation plate elements.

8. The system of claim 1 wherein the actuator assembly comprises one of: a rotary electric actuator assembly, a linear hydraulic actuator assembly, and a ball screw actuator assembly.

9. The system of claim 1 wherein the actuator assembly comprises an actuator element and a locking element, the locking element configured to lock the unfixed wing tip portion in a rotation position relative to the fixed wing portion when the actuator element actuates the rotation joint.

10. The system of claim 1 wherein the selected operation condition provides a position of the unfixed wing tip portion comprising one of: an unfolded flight position, an aft folded ground position, and a forward folded flight position.

11. An aircraft having fail-safe load paths for one or more wings, the aircraft comprising:
    at least one fuselage;
    one or more wings having a swing wing tip assembly, the swing wing tip assembly comprising:
        an unfixed wing tip portion movably connected to a fixed wing portion of the one or more wings;
        a dual load path structure providing fail-safe load paths comprising dual wing skins and a rotation joint to carry load in a fail-safe manner for the one or more wings and dual load path structure configured to transfer load from the unfixed wing tip portion to the fixed wing portion, the dual load path structure comprising:
            dual wing skin plates comprising an upper wing skin with a separate titanium plate portion attached to the upper wing skin and a lower wing skin with another separate titanium plate portion attached to the lower wing skin, the separate titanium plate portions being flush with the respective upper wing skin and the lower wing skin; and
            the rotation joint coupled between the dual wing skins and configured to rotationally couple the unfixed wing tip portion to the fixed wing portion, the dual wing skins positioned across both sides of the rotation joint, the rotation joint comprising:
                a dual rotation pin element having a center rotation axis; and,
                dual rotation elements configured to rotate about the center rotation axis; and,
                dual channel segments coupled between the dual wing skins;
        an actuator assembly operatively coupled to the rotation joint to actuate the rotation joint enabling rotation of the unfixed wing tip portion with respect to the fixed wing portion about the center rotation axis at a selected operation condition;
    a controller system operatively coupled to the actuator assembly to control actuation of the rotation joint and rotation of the unfixed wing tip portion; and,
    a navigation element positioned near a hinge line between the fixed wing portion and the unfixed wing tip portion and operable to be exposed and activated in response to rotation of the unfixed wing tip portion.

12. The aircraft of claim 11 wherein the aircraft has a wingspan configured to reduce in length to provide a reduced wingspan to allow ground operation of the aircraft at an airport that prohibits ground operation of aircraft with an expanded wingspan.

13. The aircraft of claim 11 wherein the selected operation condition provides a position of the unfixed wing tip portion comprising one of: an unfolded flight position, an aft folded ground position, and a forward folded flight position.

14. The aircraft of claim 11 wherein the swing wing tip assembly further comprises a moving panel positioned near a trailing edge of the unfixed wing tip portion and configured to move before the unfixed wing tip portion is rotated.

15. A method for providing fail-safe load paths for a wing of an air vehicle, the method comprising the steps of:
    operatively coupling a swing wing tip assembly to a wing of an air vehicle, the swing wing tip assembly comprising:
        an unfixed wing tip portion movably connected to a fixed wing portion of the wing; and,
        a dual load path structure providing two separate load bearing paths comprising dual wing skins and a rotation joint to carry load in a fail-safe manner, and the dual load path structure comprising:
            dual wing skin plates comprising an upper wing skin with a separate plate portion attached to the upper wing skin and comprising a lower wing skin with another separate plate portion attached to the lower wing skin, the separate plate portions being flush with the respective upper wing skin and the lower wing skin; and,
            a rotation joint coupled between the dual wing skins, the dual wing skins positioned across both sides of the rotation joint, the rotation joint comprising a dual rotation pin element having a center rotation axis and dual rotation elements configured to rotate about the center rotation axis;
    operatively coupling an actuator assembly to the rotation joint;
    operatively coupling a controller system to the actuator assembly to control the actuator assembly to actuate the rotation joint; and,
    transferring load from the unfixed wing tip portion to the fixed wing portion via the dual load path structure to provide fail-safe load paths for the wing.

16. The method of claim 15 further comprising the step of rotating the unfixed wing tip portion with respect to the fixed wing portion about the center rotation axis at a selected operation condition.

17. The method of claim 16 wherein the step of rotating the unfixed wing tip portion at the selected operation condition further comprises rotating the unfixed wing tip portion to provide an aft folded ground position.

18. The method of claim 16 wherein the step of rotating the unfixed wing tip portion at the selected operation condition further comprises rotating the unfixed wing tip portion to provide a forward folded flight position.

19. The method of claim 16 further comprising operatively coupling a navigation element near a hinge line between the fixed wing portion and the unfixed wing tip portion to be exposed and activated in response to rotation of the unfixed wing tip portion.

20. The method of claim 16 further comprising the step of moving a moving panel positioned near a trailing edge of the unfixed wing tip portion before rotating the unfixed wing tip portion.

21. The method of claim 15 further comprising the step of maintaining the unfixed wing tip portion without rotation to provide an unfolded flight position.

* * * * *